(12) United States Patent
Pretorius

(10) Patent No.: US 8,174,773 B2
(45) Date of Patent: May 8, 2012

(54) ANAMORPHOTIC IMAGING OBJECTIVE

(75) Inventor: Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 105 days.

(21) Appl. No.: 12/432,216

(22) Filed: Apr. 29, 2009

(65) Prior Publication Data

US 2009/0268305 A1   Oct. 29, 2009

Related U.S. Application Data

(60) Provisional application No. 61/048,614, filed on Apr. 29, 2008.

(30) Foreign Application Priority Data

Apr. 29, 2008 (DE) .......................... 10 2008 021 341

(51) Int. Cl.
*G02B 13/08* (2006.01)
*G02B 9/00* (2006.01)
*G02B 21/02* (2006.01)

(52) U.S. Cl. .......................... 359/668; 359/648; 359/656

(58) Field of Classification Search .................. 359/668, 359/710, 711, 648
See application file for complete search history.

(56) References Cited

U.S. PATENT DOCUMENTS

| | | | |
|---|---|---|---|
| 2,048,284 A | 7/1936 | Newcomer | |
| 2,752,821 A | 7/1956 | Cook | |
| 2,933,017 A | 4/1960 | Kingslake et al. | |
| 3,041,935 A | 7/1962 | Jacobsen | |
| 3,751,138 A | 8/1973 | Humphrey | |
| 4,362,366 A | 12/1982 | Gottschalk | |
| 4,805,998 A | 2/1989 | Chen et al. | |
| 5,184,880 A | 2/1993 | Lisziewicz | |
| 5,339,193 A | 8/1994 | Korpert et al. | |
| 6,603,608 B2 * | 8/2003 | Togino | 359/676 |
| 6,728,040 B1 | 4/2004 | Mikhailov et al. | |
| 6,995,920 B2 | 2/2006 | Nurishi | |
| 7,224,523 B2 * | 5/2007 | Fukuyama et al. | 359/385 |
| 7,405,884 B2 * | 7/2008 | Nishioka et al. | 359/665 |
| 2002/0003670 A1 | 1/2002 | Oliva | |
| 2003/0189760 A1 | 10/2003 | Miks et al. | |
| 2004/0196570 A1 | 10/2004 | Nurishi | |
| 2005/0168829 A1 | 8/2005 | Nurishi et al. | |
| 2005/0225726 A1 | 10/2005 | Miyagishima et al. | |
| 2005/0225727 A1 | 10/2005 | Neil et al. | |
| 2005/0225876 A1 | 10/2005 | Nurishi | |
| 2006/0050403 A1 | 3/2006 | Neil | |
| 2007/0052833 A1 | 3/2007 | Matsui et al. | |
| 2007/0133107 A1 * | 6/2007 | Ohzawa et al. | 359/749 |
| 2008/0170310 A1 * | 7/2008 | Mann | 359/839 |

FOREIGN PATENT DOCUMENTS

| | | |
|---|---|---|
| DE | 36 29 438 C2 | 4/1988 |
| DE | 10 2007 005 168 A1 | 7/2008 |
| EP | 0 467 281 B1 | 12/1995 |
| GB | 2 430 272 A | 3/2007 |

* cited by examiner

*Primary Examiner* — Jordan Schwartz

(74) *Attorney, Agent, or Firm* — Patterson Thuente Christensen Pedersen P.A.

(57) ABSTRACT

An anamorphic imaging objective having multiple effective optical surfaces. One of the effective surfaces is implemented as anamorphic and one of the effective surfaces is implemented as a free-form surface, which has an aspheric contour in at least one of the two main sections and which has precisely two planes of mirror symmetry, the main sections lying in the planes of mirror symmetry.

83 Claims, 18 Drawing Sheets

ANAMORPHOTIC IMAGING OBJECTIVE

CROSS-REFERENCES TO RELATED APPLICATIONS

The present application claims the benefit of U.S. Provisional Application No. 61/048,614, filed Apr. 29, 2008, and DE Patent Application No. 10 2008 021 341.1 filed Apr. 29, 2008. Said applications are incorporated herein by reference in their entirety.

FIELD OF THE INVENTION

The present invention relates to an anamorphic imaging objective. Such objectives are required, for example, when recording wide format motion pictures.

BACKGROUND OF THE INVENTION

For the purpose of better exploitation of the 35 mm film format, it is typical to record a horizontally compressed image (using an anamorphic imaging objective) to fill the format on the 35 mm film. When playing back the film, an anamorphic imaging objective is again needed, which images the recorded film using different enlargements in the two main sectional planes, so that the film is shown undistorted in the wide format on the motion picture screen.

Anamorphic imaging objectives are also used in the post-processing of motion pictures. For this purpose, the filmstrips of the original recording, the so-called master, is recopied onto another film while simultaneously performing certain filter operations. During this recopying procedure, for example, the aspect ratio of the original film recording may subsequently be changed using an anamorphic imaging objective.

Anamorphic imaging objectives in which cylindrical and toric lenses are used in one or more groups to achieve the anamorphic effect are known. In particular, a rotationally-symmetric main objective is frequently combined with one or more anamorphically effective auxiliary elements. However, all of these solutions have imaging errors in undesired amounts and lead to unsatisfactory results.

SUMMARY OF THE INVENTION

Proceeding therefrom, the invention provides an anamorphic imaging objective which has improved imaging properties.

Due to the use of the free-form surface, a significant improvement of the correction of the imaging errors caused by the anamorphic imaging objective is possible. In this way, more compact (in particular very short) anamorphic imaging objectives having higher aperture ratio are possible, which have better optical correction.

Thus, according to one further embodiment, at least two effective surfaces (e.g., two, three, four, five, or more) may be implemented as free-form surfaces in the meaning of the present invention. An outstanding correction of the imaging objective is thus possible.

Furthermore, the imaging objective may have multiple anamorphic effective surfaces.

The free-form surface may have arbitrary, i.e., in particular also equal vertex curvatures.

The anamorphic effect of the entire objective may be achieved, for example, by conventional lenses, such as cylindrical lenses or toric lenses. The free-form surfaces do not necessarily have to be an anamorphic themselves (but may be). Anamorphic is understood here in particular to mean that the vertex curvatures differ. If the free-form surface is not anamorphic, it may correct image errors, which the anamorphic objective has because of its other lenses or rather its other effective surfaces, by higher polynomial coefficients, for example, which are different in both main sections. Of course, the free-form surface may be anamorphic, i.e., have different vertex curvatures in both sections.

In the imaging objective, all optical effective surfaces may be transparent. In this example, the imaging objective only has refractive elements.

However, it is also possible to implement the imaging objective as reflective. In particular, a part of the effective surfaces may be implemented as transmissive and a part of the effective surfaces may be implemented as reflective.

In the imaging objective, at least one optically effective surface, which is implemented as a free-form surface, may be positioned in a close-to-field manner near-by the objective. Close-to-field manner is understood here in particular as positioning in which the absolute value of the ratio of the ray height of a marginal ray of a field point lying on the optical axis and the ray height of a chief ray of a field point at the maximum radial distance from the optical axis is greater than 0.5. In particular, the absolute value may be greater than 1 or also greater than 2.

Independent influencing of the chief ray trajectory in both main sections may be performed by the close-to-field positioning of the free-form surface. Those forms of distortion which have a different dependence on the particular ray height existing in the main section in each case in the horizontal and vertical main sections may thus be corrected.

Furthermore, in the imaging objective, at least one effective optical surface which is implemented as a free-form surface may be positioned near the aperture. Positioning near the aperture is understood here in particular to mean that the absolute value of the ratio of the ray height of a marginal ray of a field point lying on the optical axis and the ray height of a chief ray of a field point at the maximum radial distance from the optical axis, is less than 0.5 (as show in one example). In another example is less than 0.2, and in a further example is less than 0.1.

The free-form surface positioned near the aperture may be used in particular for the correction of coma and astigmatism of paraxial ray bundles.

The imaging objective according to the invention is particularly corrected using the free-form surfaces in regard to the undesired distortions so that the distortion value, in one example, is less than 7%, in another example is less than 5%, and in a further example than 3%. The distortion value is understood here as the relative deviation of a penetration point of a chief ray originating from a field point through the image plane to the radial image location of the field point upon error-free imaging in relation to the optical axis in the image plane.

In the imaging objective, at least one of the free-form surfaces may have an aspheric contour in both main sections.

The free-form surfaces may particularly be selected so that they deviate at a mean best-adapted rotationally-aspheric or toric surface for example by less than 20 μm, in another example less than 10 μm, and in a further example by less than 5 μm. The production of the imaging objective is thus simplified, because initially the best-adapted rotationally-aspheric or toric surface is produced and the deviation then still existing is performed by material ablation using conventional fine correction methods, such as ion-beam-induced ablation.

In the imaging objective, at least one effective optical surface may be implemented as a rotationally-symmetric asphere for the correction of rotationally-symmetric (e.g., aperture-dependent or field-dependent) imaging errors.

Furthermore, in the imaging objective, one or more of the effective optical surfaces may be provided as jointly axially displaceable focusing group, in order to focus the imaging objective, each of the focal lengths of the focusing group in both main sections being inversely proportional to the particular focal length of the imaging objective in the corresponding main section. In such an imaging objective, the desired focusing may be performed using only one movement, without disadvantageously changing the other imaging properties of the imaging objective. In particular, an actuator or a control element may be provided for moving the focusing group.

The imaging objective according to the invention may be implemented so that it performs anamorphic imaging from infinite to finite, from finite to finite, or from finite to infinite. Infinite is understood here in particular as an object or image distance which is at least greater than 100 times the longer of the two focal lengths in the two main sections of the imaging objective.

The imaging objective may be used as the sole imaging objective for the desired anamorphic imaging. However, it is also possible to use the imaging objective as an intermediate imaging objective, in order to anamorphically image an image imaged by a typical objective in the course of intermediate imaging on the image plane.

Furthermore, a production method of an anamorphic imaging objective is provided, in which first the anamorphic imaging objective is designed, production data are derived from the design, and the imaging objective is produced on the basis of the production data, the design of the imaging objective starting from a not yet corrected model objective having multiple effective optical surfaces, at least one of which is implemented as anamorphic, and then a computerized optimization being performed in such a way that the division of the optical power necessary for the desired anamorphic imaging, which differs in the two optical main sections of the imaging objective, which are perpendicular to one another, is performed on the effective optical surfaces in each of the two optical main sections according to the criterion that imaging errors of the imaging objective are minimized.

Through such a procedure, the structural separation of a main objective and additional anamorphic auxiliary elements typical until now is abandoned, whereby the imaging errors may be kept extremely low and simultaneously an especially short overall length is achievable in the imaging objective.

In the method, multiple effective optical surfaces of the model objective may each be implemented as anamorphic and during the computerized optimization the difference in optical power (and thus the corresponding radii of curvature) in the main sections may be ascertained for each anamorphic effective surface after the performed division of the optical power, and if the value exceeds a minimum value, the effective surface may be established as an anamorphic active surface and if the value falls below the minimum value, the effective surface may be established as a rotationally-symmetric effective surface. The number of the anamorphic effective surfaces may thus be minimized, which makes the objective easier to produce.

Furthermore, at least one of the anamorphic effective surfaces may be provided as a free-form surface, which has an aspheric contour in at least one of the two main sections and planes of mirror symmetry lying in the main sections. The at least one free-form surface may have a different vertex curvature in both main sections.

The imaging objective according to the invention may for example have an aperture ratio (square root of the product of the two aperture ratios in the vertical and horizontal main sections of the image) of, for example, less than or equal to 2.0, in another example less than or equal to 1.7, and in a third example less than or equal to 1.4, the overall length, for example, being able to be less than 250 mm, and in another example, less than 200 mm at an image field size of 18.8×22.4 mm. The vertex distance from vertex of the first lens up to the image plane is understood here as the overall length.

It will be appreciated that the above-mentioned features and the features to be explained hereafter are usable not only in the indicated combinations, but rather also in other combinations or alone, without leaving the scope of the present invention.

BRIEF DESCRIPTION OF THE DRAWINGS

The invention is explained in greater detail for exemplary purposes hereafter on the basis of the appended drawings, which also disclose features essential to the invention. In the figures.

DETAILED DESCRIPTION

Figure 1:
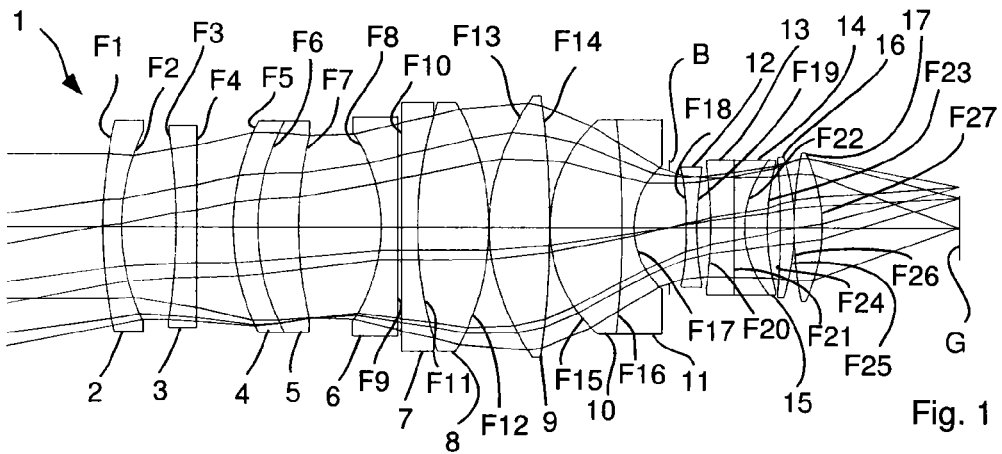
FIG. 1 depicts a vertical lens section of an anamorphic imaging objective according to a first embodiment.
Figure 2:
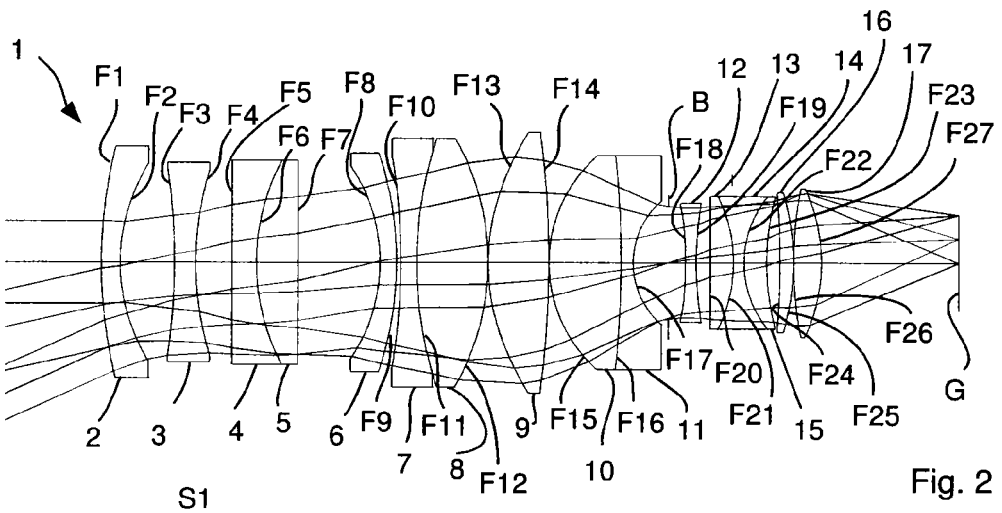
FIG. 2 depicts a horizontal lens section of the anamorphic imaging objective of FIG. 1.

In the embodiment shown in FIGS. 1 and 2, the anamorphic imaging objective 1 according to the invention comprises sixteen lenses 2-17, two effective optical surfaces (F2, F13) of the sixteen lenses being implemented as free-form surfaces in the meaning of the present invention.

A free-form surface in the meaning of the invention is understood as an anamorphic effective optical surface which has an aspheric contour in at least one of the two main sections and which has precisely two planes of mirror symmetry, the main sections lying in the planes of mirror symmetry.

The free-form surface may, but does not have to have a different vertex curvature in its two main sections (for example vertical main section (FIG. 1) and horizontal main section (FIG. 2)).

The free-form surface is particularly implemented so that the refractive power changes with twofold symmetry, if one travels along an azimuth circle once around the optical axis. The azimuth circle is coaxial to the optical axis of the imaging objective and is in a plane which is perpendicular to each of the two main sections.

Using such free-form surfaces it is possible to set the imaging properties independently of one another in the two main sections.

The free-form surface F2 of the lens 2 is positioned in a close-to-field manner here, so that image geometry errors (distortions) may be corrected especially effectively using the free-form surface F2. Positioning in which the absolute value of r2/r1 is for example greater than 0.5, in another example greater than 1, and in a third example greater than 2, is identified here as close-to-field manner positioning. In this case, r1 denotes the ray height of a chief ray of a field point P1 at the maximum radial distance from the optical axis OA, the chief ray being the ray originating from the field point and running through the center of the stop B of the imaging objective 1. r2 is the ray height of a marginal ray of a field point lying on the optical axis OA.

Figure 3:
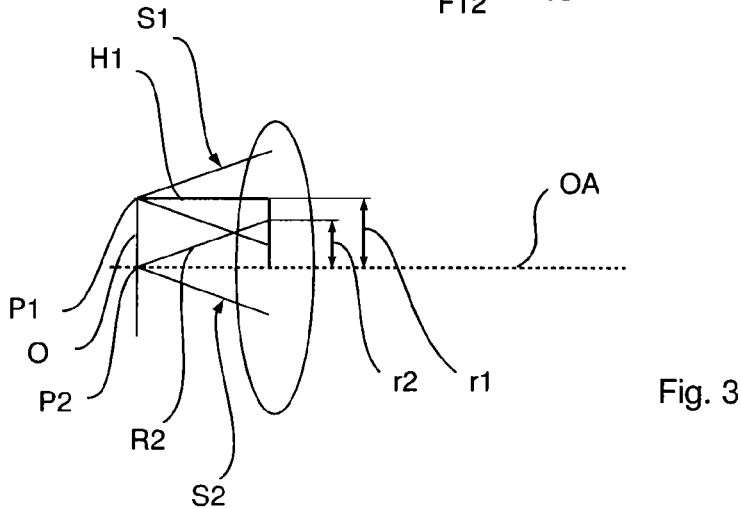
FIG. 3 is a schematic illustration to explain the positioning of the free-form surfaces in the imaging objective.

The ray heights r1 and r2 are shown in the schematic illustration of FIG. 3, in which only the field (object) 0 to be imaged, the field points P1, P2, the ray bundles S1, S2 originating from these field points P1, P2, the chief ray H1 of the first ray bundle S1, the marginal ray R2 of the ray bundle S2 up to a first lens L, which is shown as representative for one of the lenses 2-17, of the objective are shown.

The chief ray trajectory may be influenced independently of one another in both main sections by the close-to-field positioning of the free-form surface F2. Those forms of distortions which have a different dependence on the particular image height or ray height existing in the main section in the horizontal and vertical main sections may thus also be corrected.

Using the imaging objective 1 according to the invention, the distortion may be corrected so that the maximum deviation of a penetration point of a chief ray originating from a field point through the receiver or image plane G from the ideal image location of the field or object point deviates by less than 3% of the image height, the radial distance of the ideal image point from the optical axis in the receiver plane being understood as the image height.

The second free-form surface F13 of the lens 9 is positioned near the aperture. Near-aperture positioning is understood here to mean that the absolute value of r2/r1 is for example less than 0.5, in another example less than 0.2, and in a third example less than 0.1. Through this near-aperture positioning, using the refractive power of the free-form surface F13, which is settable independently of one another in the two main sections, an effective correction of coma and astigmatism of near-axis ray bundles may be achieved.

Using the two free-form surfaces F2 and F13, not only the image geometry errors (free-form surface F2) and the aperture-dependent imaging errors (free-form surface F13) but rather also mixed image errors, which are dependent on both field and also aperture, may be corrected.

The free-form surfaces F2 and F13 may be described according to the following formula 1

$$z = \frac{(x^2 + y^2)/R}{1 + \sqrt{1 - (1+k) \cdot \frac{(x^2 + y^2)}{R^2}}} + \sum_{m,n=1}^{\infty} C_{m,n} x^m y^n \quad (1)$$

In this case, x, y, and z identify the three Cartesian coordinates of a point lying on the surface in the local surface-related coordinate system. R, k and the coefficients $C_{m,n}$ are specified in following Table 1. To simplify the representation, the coefficients $C_{m,n}$ are identified as C(m,n) in Table 1.

TABLE 1

| Coefficient | F2 | F13 |
|---|---|---|
| R | 90.00 | 60.42 |
| k | −1.0556E+01 | 0.00000 |
| C(2, 0) | 7.0000E−03 | 1.7860E−03 |
| C(0, 2) | 4.8334E−03 | 2.5915E−03 |
| C(4, 4) | 2.0296E−06 | −4.5517E−07 |
| C(2, 2) | 3.8351E−06 | −8.5440E−07 |
| C(0, 4) | 2.0052E−06 | −4.3275E−07 |
| C(6, 0) | −6.7479E−10 | −1.1871E−10 |
| C(4, 2) | −1.9945E−09 | −2.4819E−10 |
| C(2, 4) | −2.1496E−09 | −1.7240E−10 |
| C(0, 6) | −7.3872E−10 | −1.0005E−10 |

In following Table 2, the basic system data for the imaging objective 1 are specified, the surface types being identified using Free for free-form surfaces, using Sph for spherical surfaces, Cyl for cylindrical surfaces, and using Asp for aspheres. Rx and Ry identify the radii in the horizontal main section (FIG. 2) and in the vertical main section (FIG. 1), respectively. In the column Distance, the distance of the surface of the assigned line to the next surface on the optical axis is specified. In the column Material, the trade name of the lens material used is entered.

The lenses 4 and 5 are cemented to one another. In Table 2, only the cemented surface F6 of the lens 4 is specified. The corresponding surface of the lens 5 has the curvature complementary thereto. This is also true for the cemented surface F11 of the lens 7, for the cemented surface F16 of the lens 10, for the cemented surface F21 of the lens 13, and for the cemented surface F22 of the lens 14.

TABLE 2

| Surface | Surface type | Rx | Ry | Distance | Material |
|---|---|---|---|---|---|
| F1 | Sph | 110.38 | 110.38 | 4.34783 | NLASF44 |
| F2 | Free | | | 12.80000 | |
| F3 | Sph | −148.08 | −148.08 | 5.00000 | FK51 |
| F4 | Cyl | 73.04 | ∞ | 8.5000 | |
| F5 | Cyl | ∞ | 54.80 | 5.60000 | FK51 |
| F6 | Sph | 50.41 | 50.41 | 9.60000 | SF6 |
| F7 | Cyl | ∞ | 93.72 | 19.27856 | |

TABLE 2-continued

| Surface | Surface type | Rx | Ry | Distance | Material |
|---|---|---|---|---|---|
| F8 | Sph | −39.47 | −39.47 | 3.80435 | LLF6 |
| F9 | Cyl | −80.10 | ∞ | 1.00000 | |
| F10 | Cyl | −149.89 | ∞ | 3.69565 | LAFN7 |
| F11 | Sph | 91.42 | 91.42 | 16.62994 | NPSK53 |
| F12 | Sph | −57.54 | −57.54 | 0.05435 | |
| F13 | Free | | | 13.98627 | NPSK53 |
| F14 | Sph | −228.48 | −228.48 | 0.05435 | |
| F15 | Sph | 33.00 | 33.00 | 16.81171 | NPSK53 |
| F16 | Sph | −238.23 | −238.23 | 2.83656 | SF2 |
| F17 | Sph | 18.84 | 18.84 | 8.20000 | |
| B | stop | ∞ | ∞ | 3.95784 | |
| F18 | Asp | −125.55 | −125.55 | 2.50000 | SF5 |
| F19 | Sph | 80.02 | 80.02 | 3.31293 | |
| F20 | Cyl | ∞ | −89.07 | 5.40000 | NLAF34 |
| F21 | Cyl | −34.69 | ∞ | 2.50000 | F5 |
| F22 | Sph | 24.38 | 24.38 | 5.22183 | NPSK53 |
| F23 | Sph | 58.00 | 58.00 | 3.14136 | |
| F24 | Sph | −186.29 | −186.29 | 3.15694 | NPSK53 |
| F25 | Sph | −57.16 | −57.16 | 0.05000 | |
| F26 | Sph | 85.82 | 85.82 | 6.55954 | NLASF44 |
| F27 | Sph | −39.89 | −39.89 | 32.00000 | |
| G | | ∞ | ∞ | | |

The material data are specified in Table 10, specified below, for these embodiments and also for the following embodiments.

A sufficiently good image error correction may typically be achieved if the polynomial development of the free-form surfaces contains terms up to a maximum order of $m+n \leq 10$. In the exemplary embodiment described here, however, terms only up to the order of $n+m \leq 6$ have been used, because outstanding results may already be achieved using such free-form surfaces. Because of the twofold mirror symmetry of the free-form surfaces F2 and F13 and thus also of the anamorphic imaging, only those terms for which both m and also n is an even number are not equal to zero and thus to be considered.

The asphere (surface F18) is implemented here as a rotation asphere and may be described according to following formula 2.

$$z = \frac{(x^2+y^2)/R}{1+\sqrt{1-(1+k)\cdot\frac{(x^2+y^2)}{R^2}}} + A\cdot(x^2+y^2)^2 + B\cdot(x^2+y^2)^3 + C\cdot(x^2+y^2)^4 + D\cdot(x^2+y^2)^5$$

The radius R of formula 2 is the value of the radius Rx or Ry of Table 2. The coefficients k, A, B, C, and D are specified in following Table 3.

TABLE 3

| Coefficient | F18 |
|---|---|
| k | 18.348923 |
| A | −0.128277E−04 |
| B | −0.112763E−07 |
| C | 0.407191E−10 |
| D | −0.171872E−12 |

Figure 4:
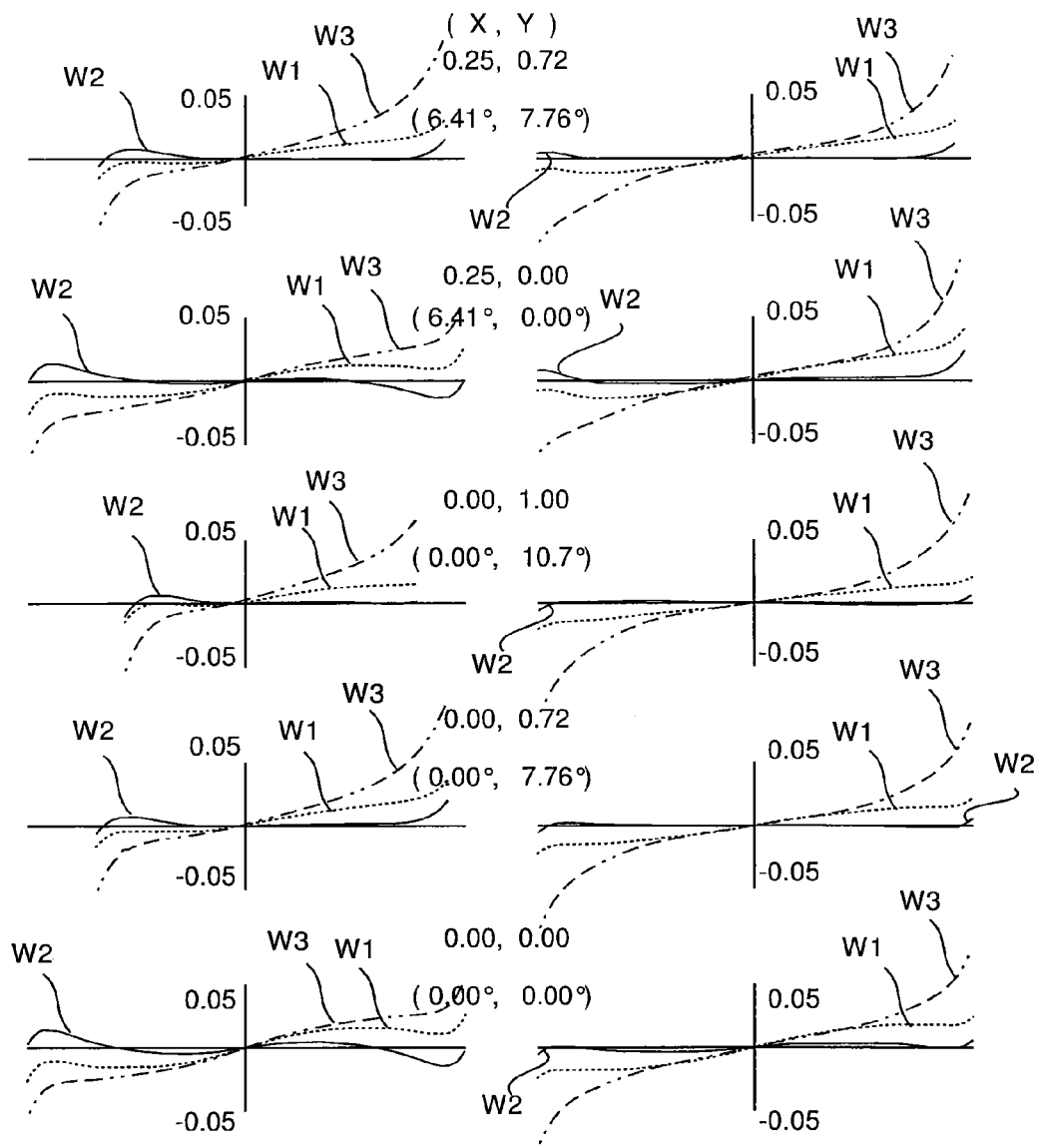
FIG. 4 depicts image error curves for the imaging objective of FIGS. 1 and 2.
Figure 5:
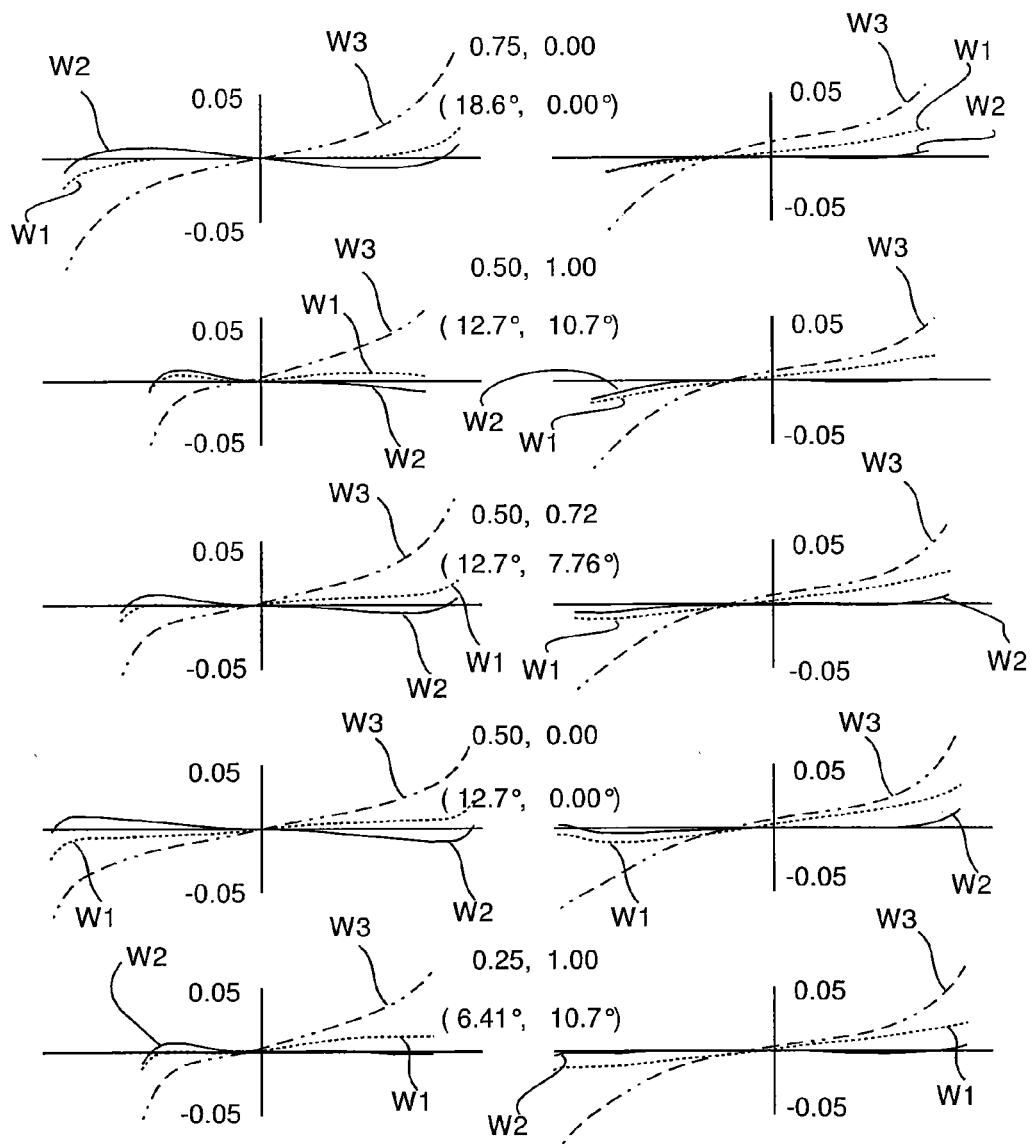
FIG. 5 depicts image error curves for the imaging objective of FIGS. 1 and 2.
Figure 6:
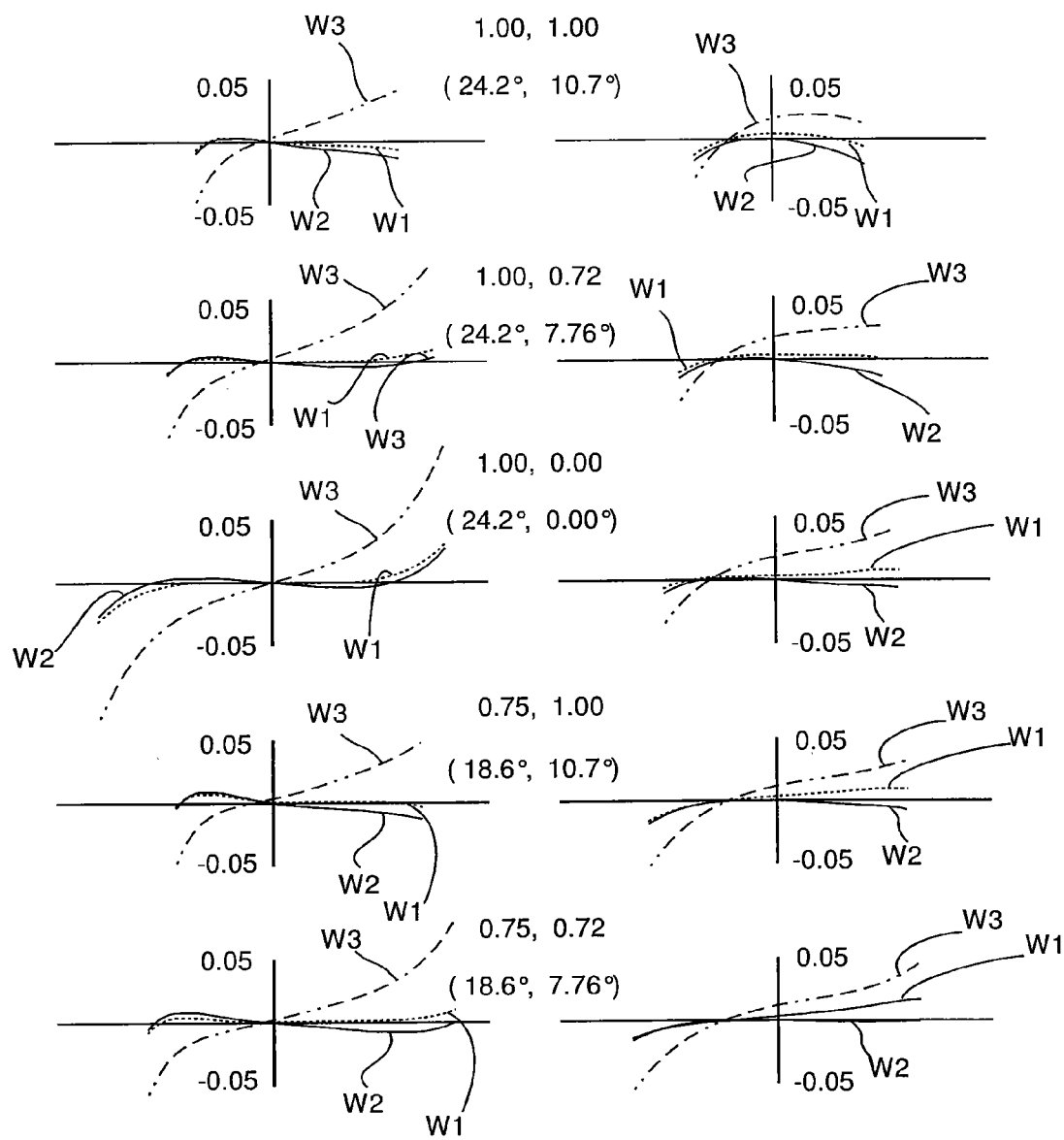
FIG. 6 depicts image error curves for the imaging objective of FIGS. 1 and 2.

Illustrations of the image error curves for the anamorphic imaging objective 1 according to FIGS. 1 and 2 are shown in FIGS. 4-6, two columns of image error curves being shown in each of FIGS. 4-6. The left column relates to the vertical plane (y-z plane) and the right column relates to the horizontal plane (x-z plane), which is perpendicular thereto. The image errors are shown in millimeters in each case for the wavelengths 656, 546, and 453 nm (identified by the reference signs W1, W2, and W3). The curves W1 are dashed, the curves W2 are shown as solid lines, and the curves W3 are shown as dot-dot-dash-dash-dash lines. The particular relative x and y image coordinates are specified between the corresponding image error curves for the vertical and horizontal planes, these relative image coordinates relating to a rectangular quadrant of 11.2×9.4 mm of the generated image format in the image plane G. Because of the mirror symmetries of all effective optical surfaces F1-F27, the image error representations result correspondingly in the other three quadrants of the image, so that an optimization of the imaging system for only one quadrant suffices.

Between the two uppermost image error curves in FIG. 4, 0.25 is specified for x and 0.72 for y as the relative coordinates. This thus corresponds to an x value of 2.8 mm (0.25× 11.2 mm=2.8 mm) and a y value of 6.8 mm (0.72×9.4 mm=6.8 mm) in the considered quadrant.

The chief ray angles in the object space are specified in each case below the relative x and y coordinates. In the two uppermost image error curves in FIG. 4, the chief ray angles are 6.41° and 7.76°.

The illustrations of FIGS. 4 through 6 relate to an object distance of infinite. An infinite object distance is viewed here as any object distance which is greater than 10 times the greater of the two focal widths of the main sections of the imaging objective 1.

Figure 7:
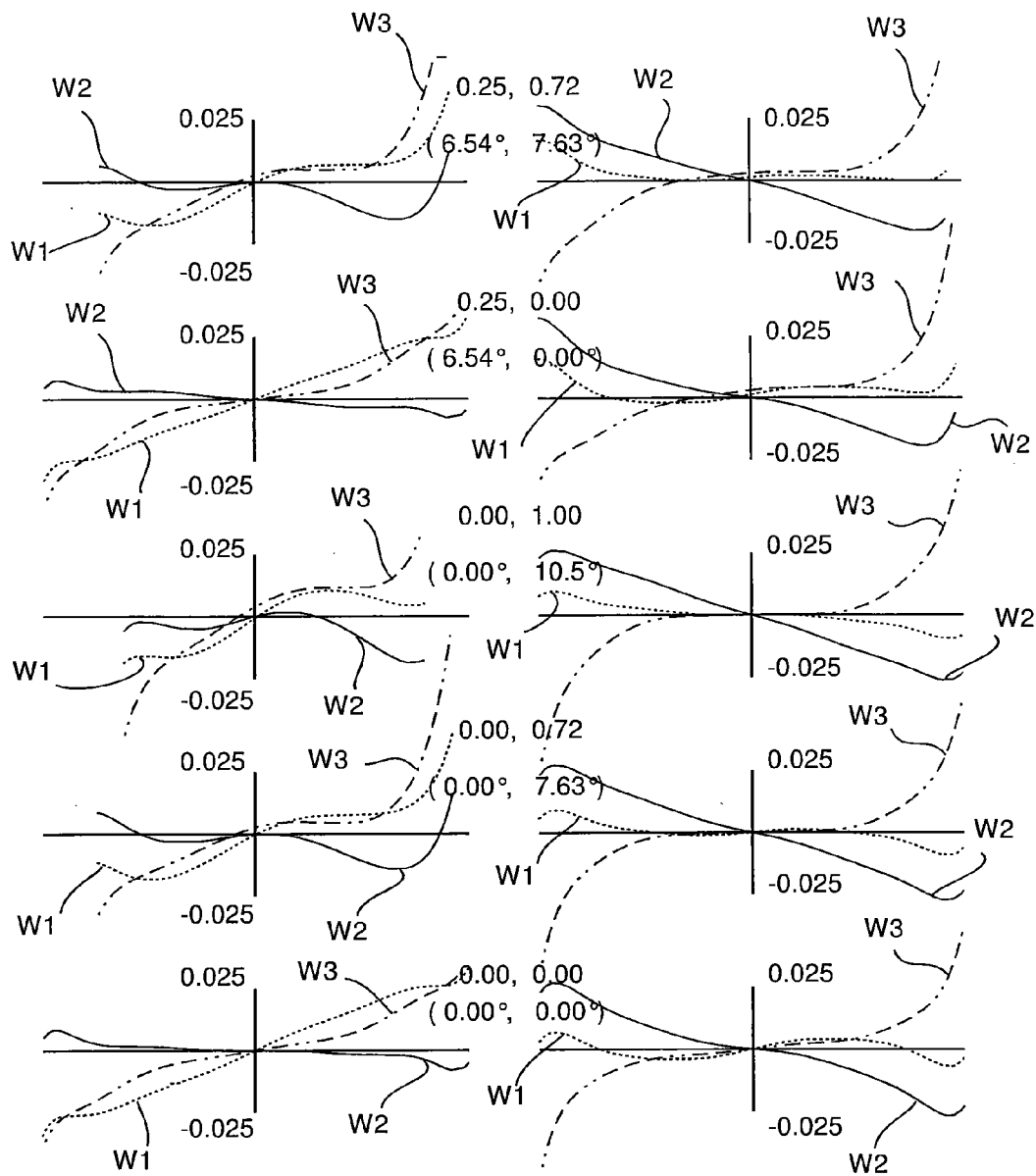
FIG. 7 depicts image error curves for the imaging objective of FIGS. 1 and 2.
Figure 8:
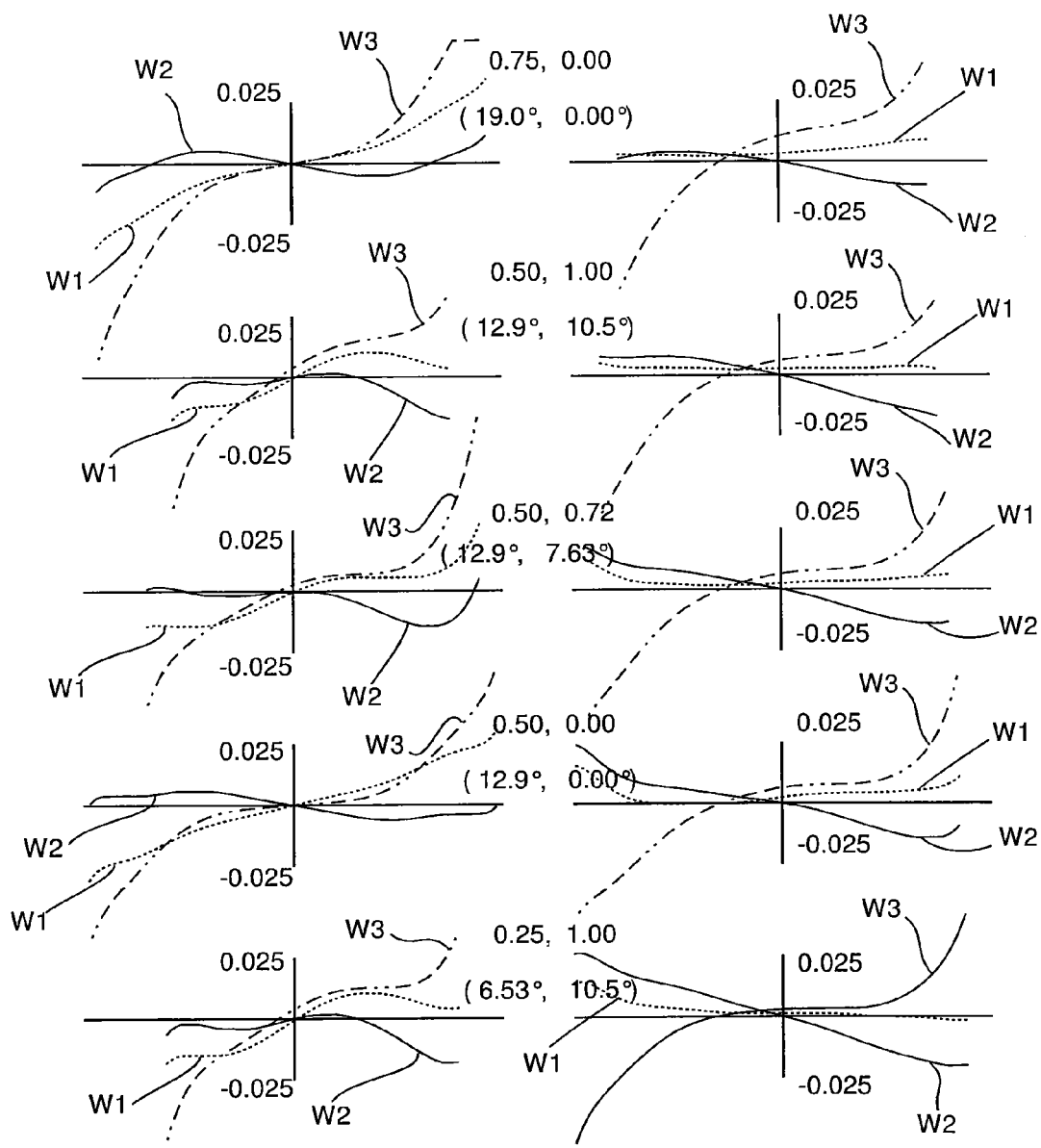
FIG. 8 depicts image error curves for the imaging objective of FIGS. 1 and 2.
Figure 9:
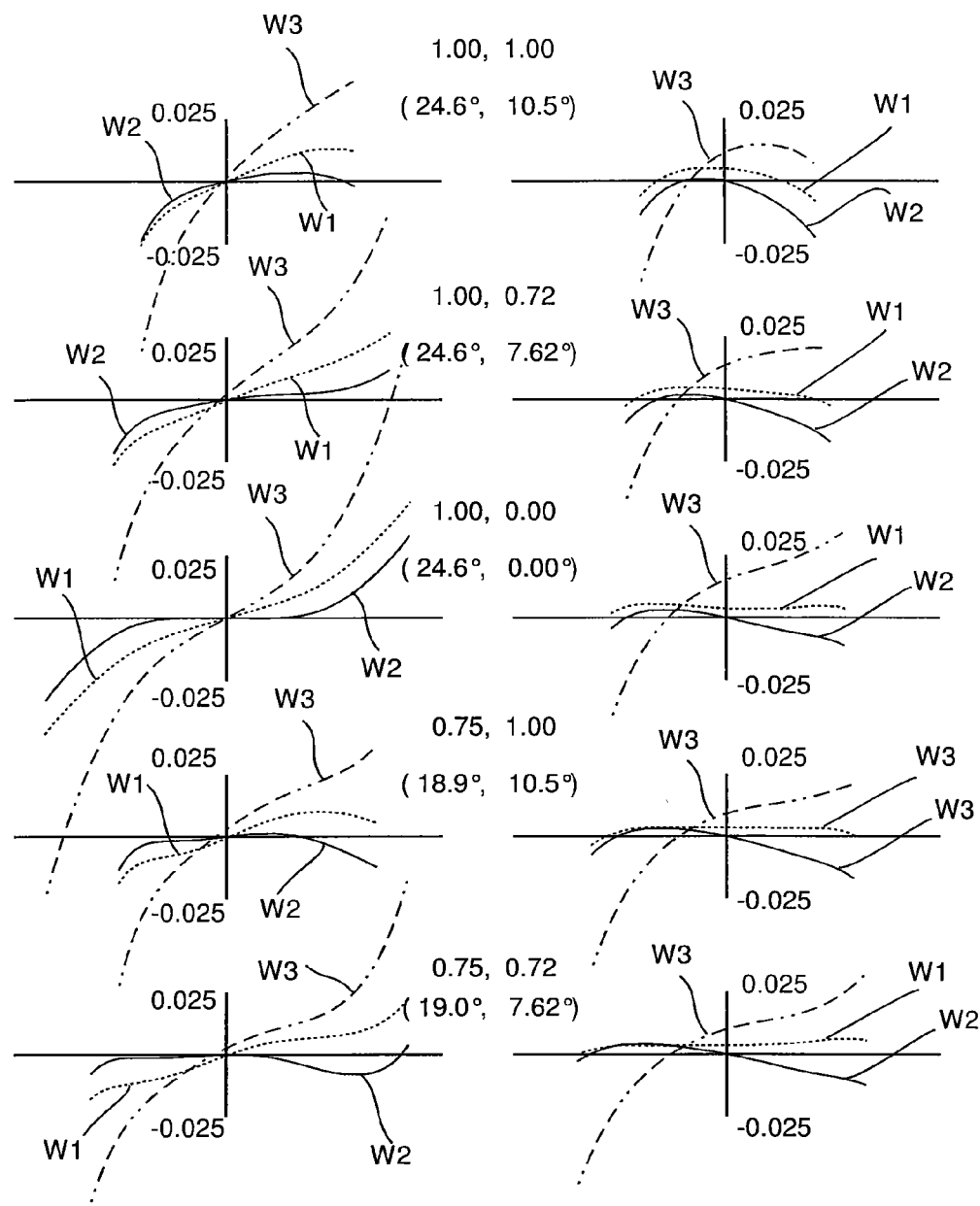
FIG. 9 depicts image error curves for the imaging objective of FIGS. 1 and 2.

In the imaging objective 1 of FIGS. 1 and 2, focusing is possible in that the lens 6 is axially displaced. Corresponding image error illustrations as in FIGS. 4 through 6 are shown in FIGS. 7, 8, and 9, focusing to an object distance of 600 mm (object distance is distance between object to be imaged and image plane G) having been performed by displacing the lens 6 in the axial direction. As may be inferred from the image error curves, the imaging objective 1 is outstandingly corrected.

Figure 10:
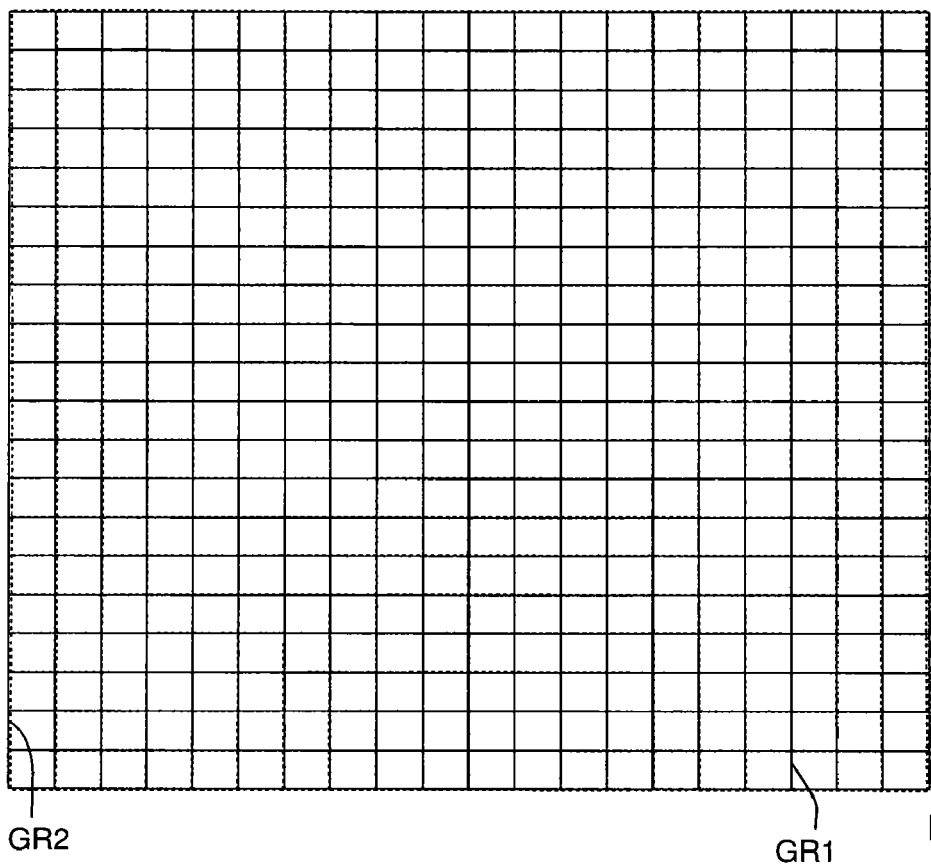
FIG. 10 is a schematic illustration to explain the distortion caused by the imaging objective 1 of FIG. 1.
Figure 11:
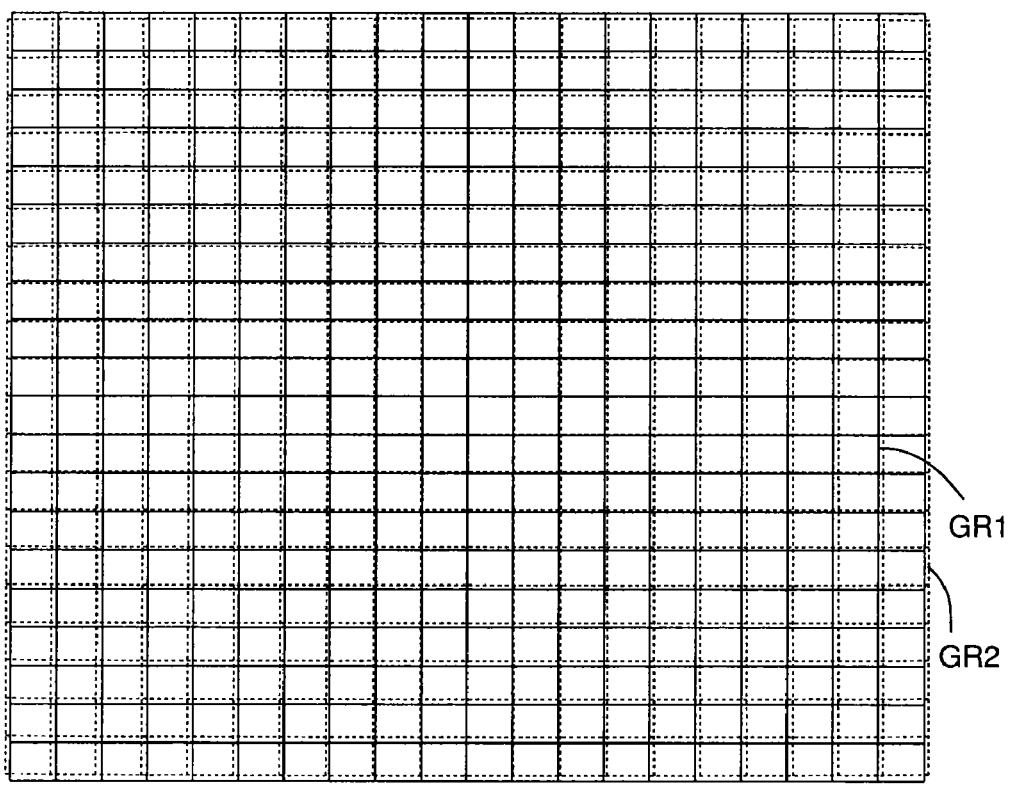
FIG. 11 is a schematic illustration to explain the distortion caused by the imaging objective 1 of FIG. 1

The distortion caused by the imaging objective 1 is schematically shown in FIG. 10. For this purpose, a regular grid GR 1 is shown using solid lines, which would be provided as the image in the event of optimal imaging. The actual imaging GR 2 of such a grid in the image plane is shown using dashed lines. The illustration of FIG. 11 is for an infinite object distance. An identical illustration is shown in FIG. 11, the object distance being 600 mm here.

As may be inferred from FIGS. 10 and 11, the grid lines run quasi-parallel to one another and are frequently also still congruent. The existing residual distortion is thus extremely low. In particular, only a parallel offset of the grid lines exists, if at all, which is much less visually disturbing than if the distortion led to sagging of the grid lines.

The imaging objective of FIGS. 1 and 2 has a horizontal focal width of 25 mm, a vertical focal width of 50 mm, a vertical opening number of 1.48, a horizontal opening number of 1.31, an effective opening number of 1.39, and a distance or rather focusing active range of infinite to 400 mm. Distance range is understood here as the distance of the object from the image plane G. The image size (i.e., the image format) is 22.4 mm×18.8 mm. The overall length of the imaging objective 1 from the vertex of the first lens 2 up to the image plane G is 200 mm.

In the imaging objective according to the invention, the free-form surfaces may particularly be designed in such a way that they deviate from a mean best-adapted rotation-aspheric surface, in one example, by less than 20 μm, in another example by less than 10 μm, and in a third example by less than 5 µm. The advantage is thus achieved that frequently a sufficient optical correction of the image errors discussed above may be achieved using such a free-form surface and the production of such free-form surfaces is simultaneously simplified, because such free-form surfaces remain easy to test using interferometry.

It may also be advantageous that the free-form surfaces according to the invention are designed, for example, so that they deviate from a mean best-adapted toric surface by less than 20 µm, in another example by less than 10 µm, and in a further example by less than 5 µm. In this case, the optical effect may also frequently be sufficient and it is easier to produce the free-form surfaces. Thus, for example, the free-form surfaces may be produced in that firstly a toric starting surface is manufactured using conventional methods, which is subsequently fine-processed using fine correction methods, such as ion-beam-induced ablation, into the desired free-form surface. Such addressed fine-correction methods are typically only suitable for ablating a glass layer which is a few micrometers thick, which would be sufficient here, of course.

Figure 12:
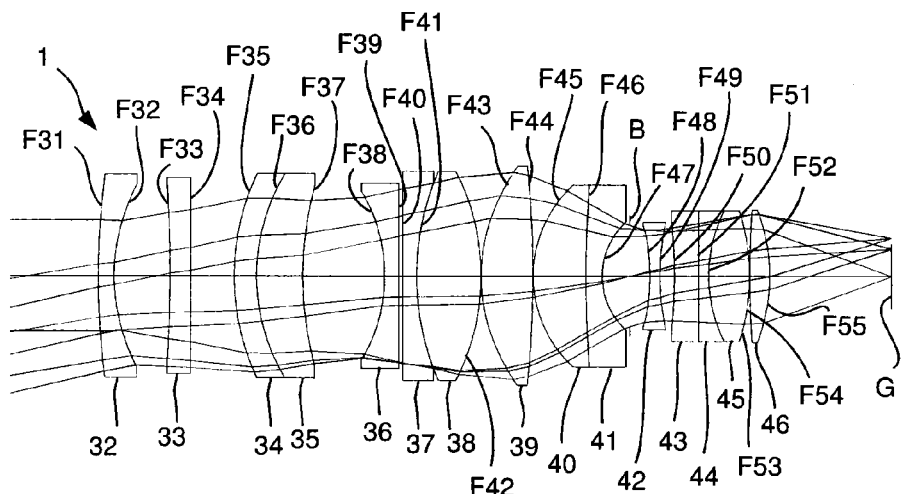
FIG. 12 depicts a vertical lens section of an anamorphic imaging objective according to a second embodiment.
Figure 13:
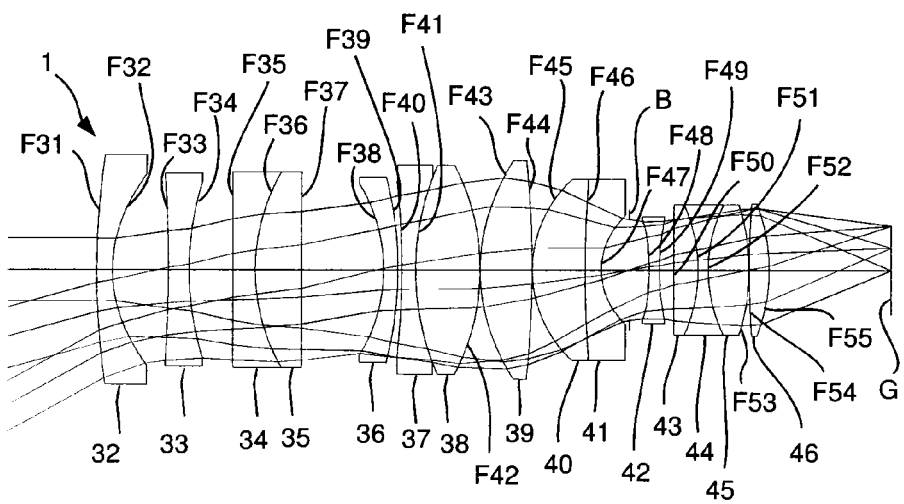
FIG. 13 depicts a horizontal lens section of the anamorphic imaging objective of FIG. 12.

A second embodiment of the imaging objective 1 according to the invention, which has fifteen lenses 32, 33, 34 ... 46, is shown in FIGS. 12 and 13. The effective optical surfaces F32 and F43 are again implemented as free-form surfaces in the meaning of the present invention.

The corresponding parameters for the description of the free-form surfaces according to formula 1 are specified in following Table 4.

TABLE 4

| Coefficient | F32 | F43 |
| --- | --- | --- |
| R | 85.00 | 49.26 |
| k | −8.4414E+00 | 0.00000 |
| C(2, 0) | 8.9967E−03 | 7.7570E−04 |
| C(0, 2) | 5.0000E−03 | 1.6857E−03 |
| C(4, 4) | 1.9429E−06 | −6.9039E−07 |
| C(2, 2) | 3.5814E−06 | −1.1948E−06 |
| C(0, 4) | 1.7072E−06 | −5.2138E−07 |
| C(6, 0) | −4.1652E−10 | −2.0882E−10 |
| C(4, 2) | −1.3611E−09 | −4.6194E−10 |
| C(2, 4) | −1.5391E−09 | −3.5690E−10 |
| C(0, 6) | −5.1280E−10 | −1.4056E−10 |

The basic construction of the imaging objective 1 of FIGS. 12 and 13 may be inferred from Table 5, which is constructed in the same way as Table 2. Also here, only the cemented surface of the lens situated further to the left in FIGS. 12, 13 is specified of the cemented surfaces of two lenses which are cemented to one another. This relates here to the cemented surfaces F36, F41, F46, F51, and F52 of the lenses 34, 37, 40, 43, and 44.

TABLE 5

| Surface | Surface type | Rx | Ry | Distance | Material |
| --- | --- | --- | --- | --- | --- |
| F31 | | 190.69 | 190.69 | 4.00000 | NLAF2 |
| F32 | Free | | | 14.00000 | |
| F33 | Cyl | ∞ | −349.98 | 5.20000 | FK51 |
| F34 | Cyl | 74.81 | ∞ | 10.80000 | |
| F35 | Cyl | ∞ | 58.79 | 5.60000 | FK51 |
| F36 | Sph | 48.95 | 48.95 | 11.50000 | SF6 |
| F37 | Cyl | ∞ | 86.31 | 20.38439 | |
| F38 | Sph | −40.92 | −40.92 | 3.50000 | FK5 |
| F39 | Cyl | −94.57 | ∞ | 1.00000 | |
| F40 | Cyl | −198.00 | ∞ | 3.40000 | LAFN7 |
| F41 | Sph | 64.19 | 64.19 | 16.05617 | NPSK53 |
| F42 | Sph | −56.76 | −56.76 | 0.05000 | |

TABLE 5-continued

| Surface | Surface type | Rx | Ry | Distance | Material |
| --- | --- | --- | --- | --- | --- |
| F43 | Free | | | 12.96738 | NPSK53 |
| F44 | Sph | −268.77 | −268.77 | 0.05000 | |
| F45 | Sph | 30.50 | 30.50 | 13.23245 | NPSK53 |
| F46 | Sph | 297.66 | 297.66 | 4.08707 | SF5 |
| F47 | Sph | 18.31 | 18.31 | 6.88309 | |
| B | stop | ∞ | ∞ | 4.91416 | |
| F48 | Asp | −66.61 | −66.61 | 2.50000 | F2 |
| F49 | Sph | 60.20 | 60.20 | 3.61006 | |
| F50 | Cyl | ∞ | −124.51 | 6.00000 | NLASF44 |
| F51 | Cyl | −39.95 | ∞ | 2.500000 | F2 |
| F52 | Sph | 35.97 | 35.97 | 10.21524 | NPSK53 |
| F53 | Sph | −52.34 | −52.34 | 0.05000 | |
| F54 | Sph | 237.93 | 237.93 | 5.00000 | NLASF44 |
| F55 | Sph | −44.97 | −44.97 | 30.5000 | |
| G | | ∞ | ∞ | | |

The aspheric coefficients of the aspheric surface F48 are specified in following Table 6.

TABLE 6

| Coefficient | F48 |
| --- | --- |
| K | 6.589294 |
| A | −0.136083E−04 |
| B | −0.898749E−08 |
| C | 0.444310E−10 |
| D | −0.175215E−12 |

Figure 14:
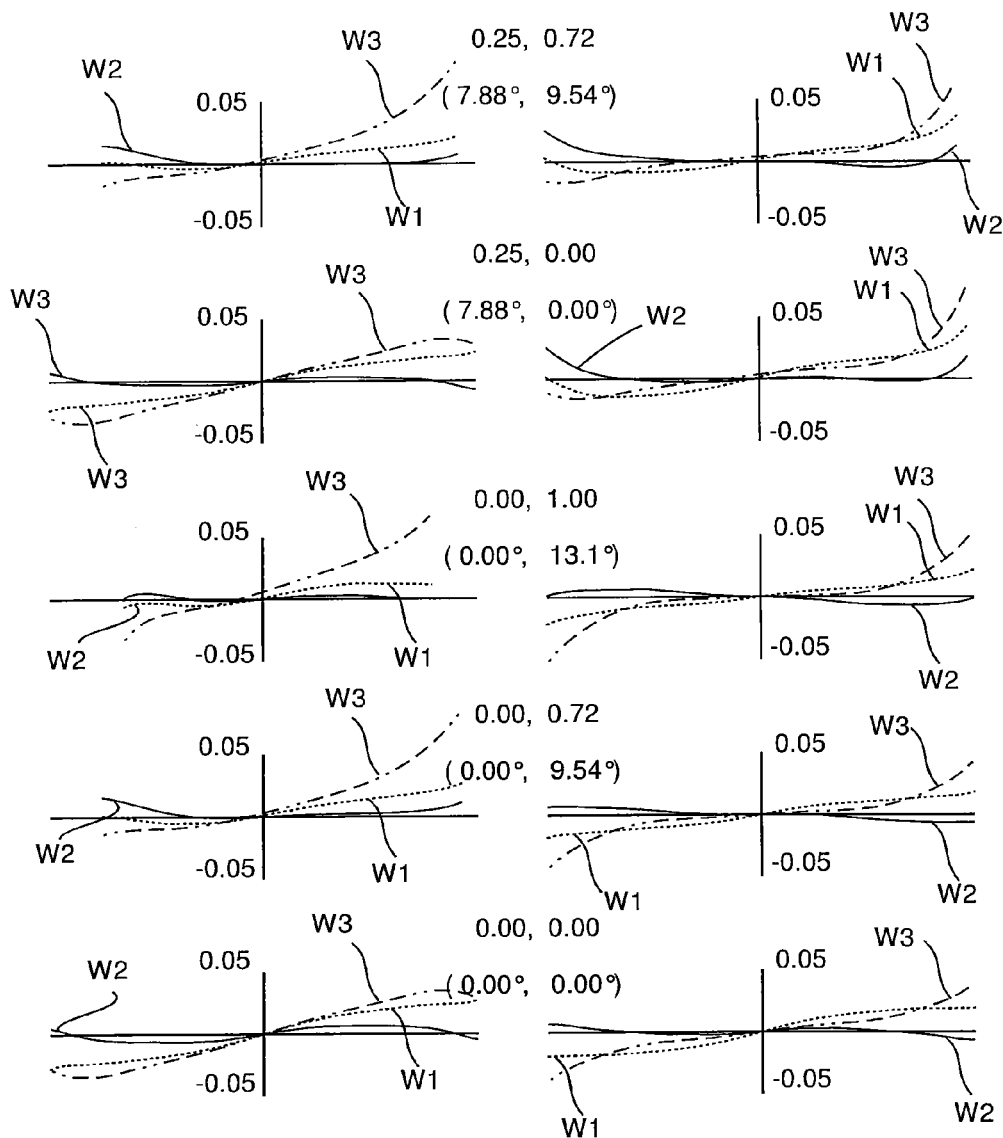
FIG. 14 depicts image error curves for the imaging objective according to FIGS. 12 and 13.
Figure 15:
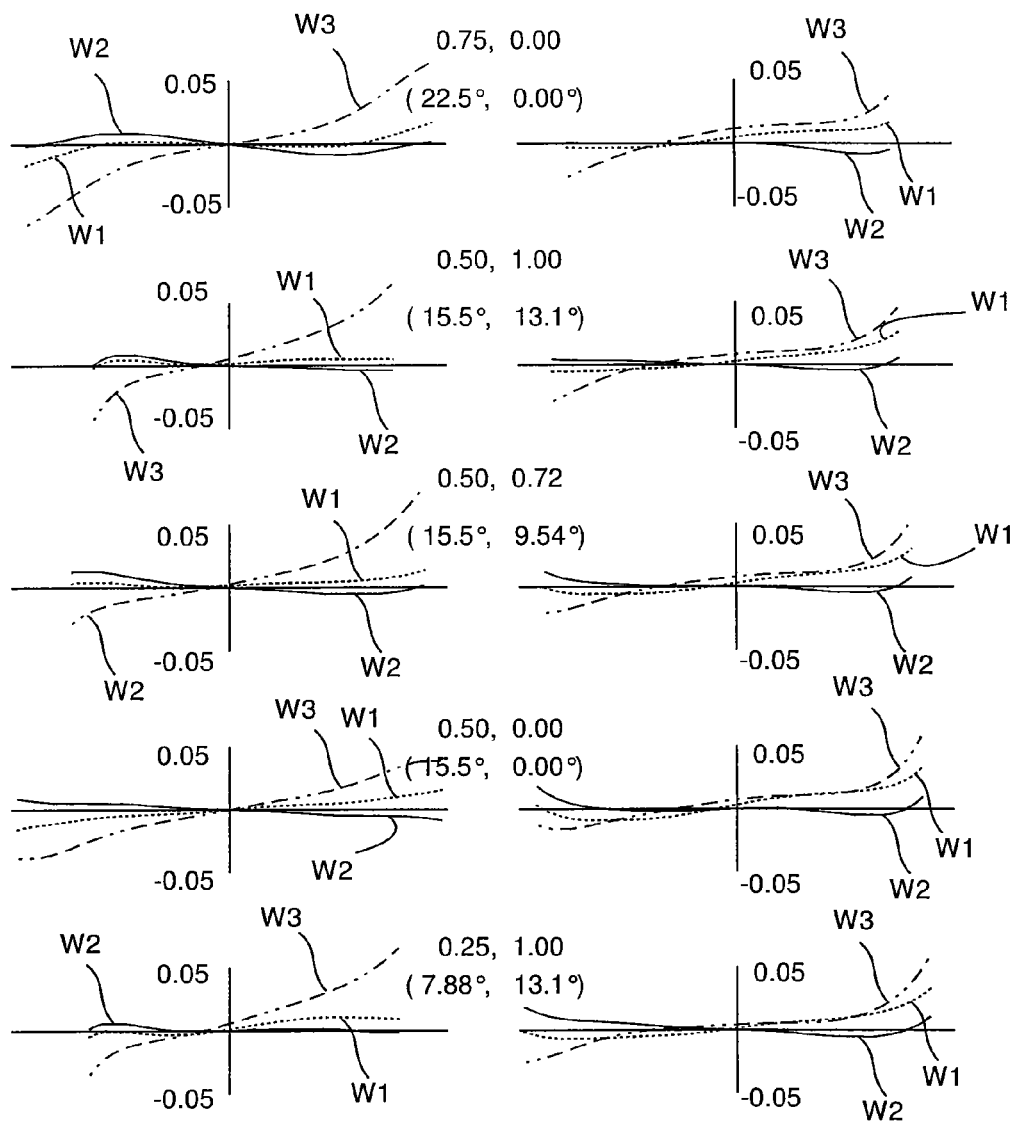
FIG. 15 depicts image error curves for the imaging objective according to FIGS. 12 and 13.
Figure 16:
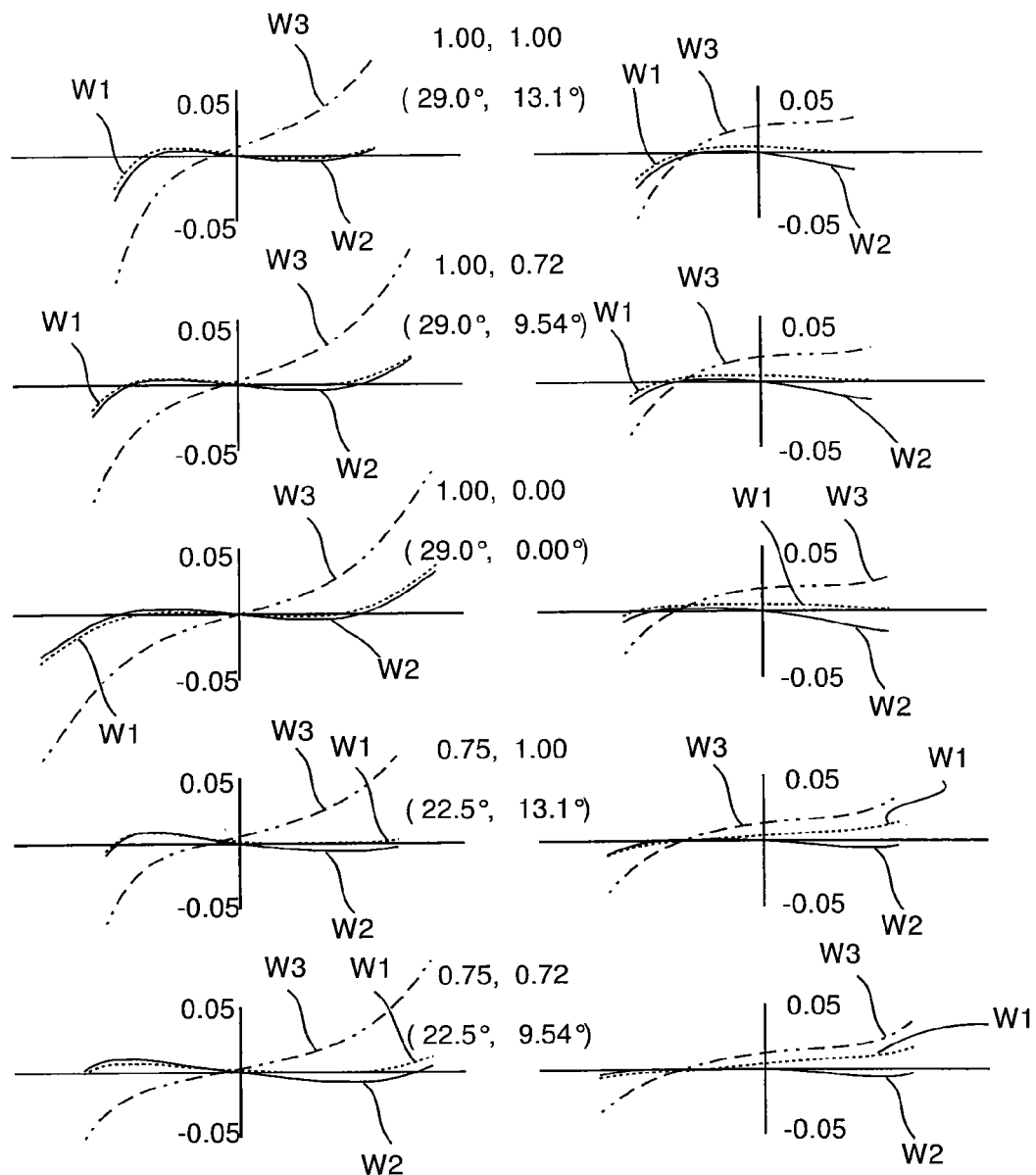
FIG. 16 depicts image error curves for the imaging objective according to FIGS. 12 and 13.
Figure 17:
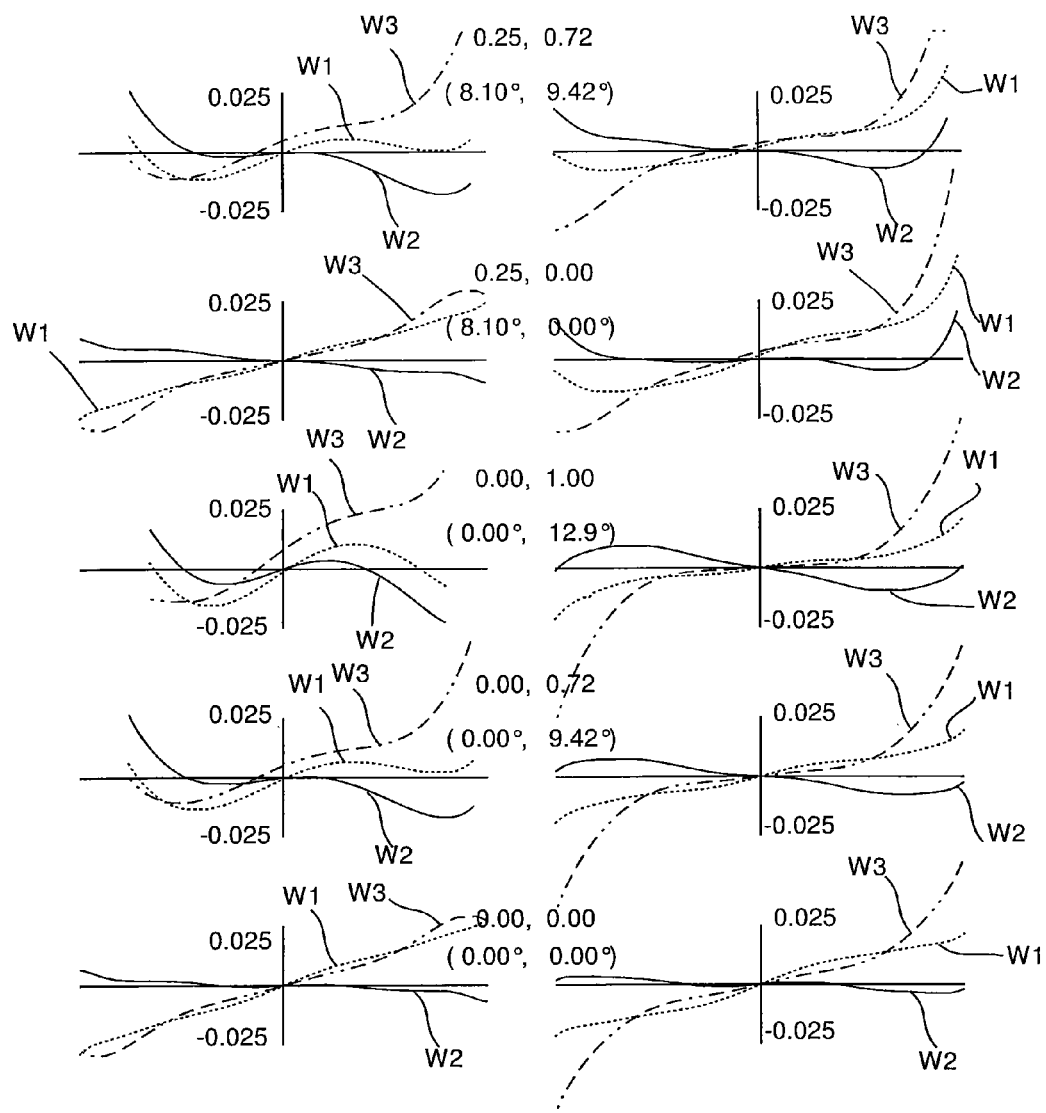
FIG. 17 depicts image error curves for the imaging objective according to FIGS. 12 and 13.
Figure 18:
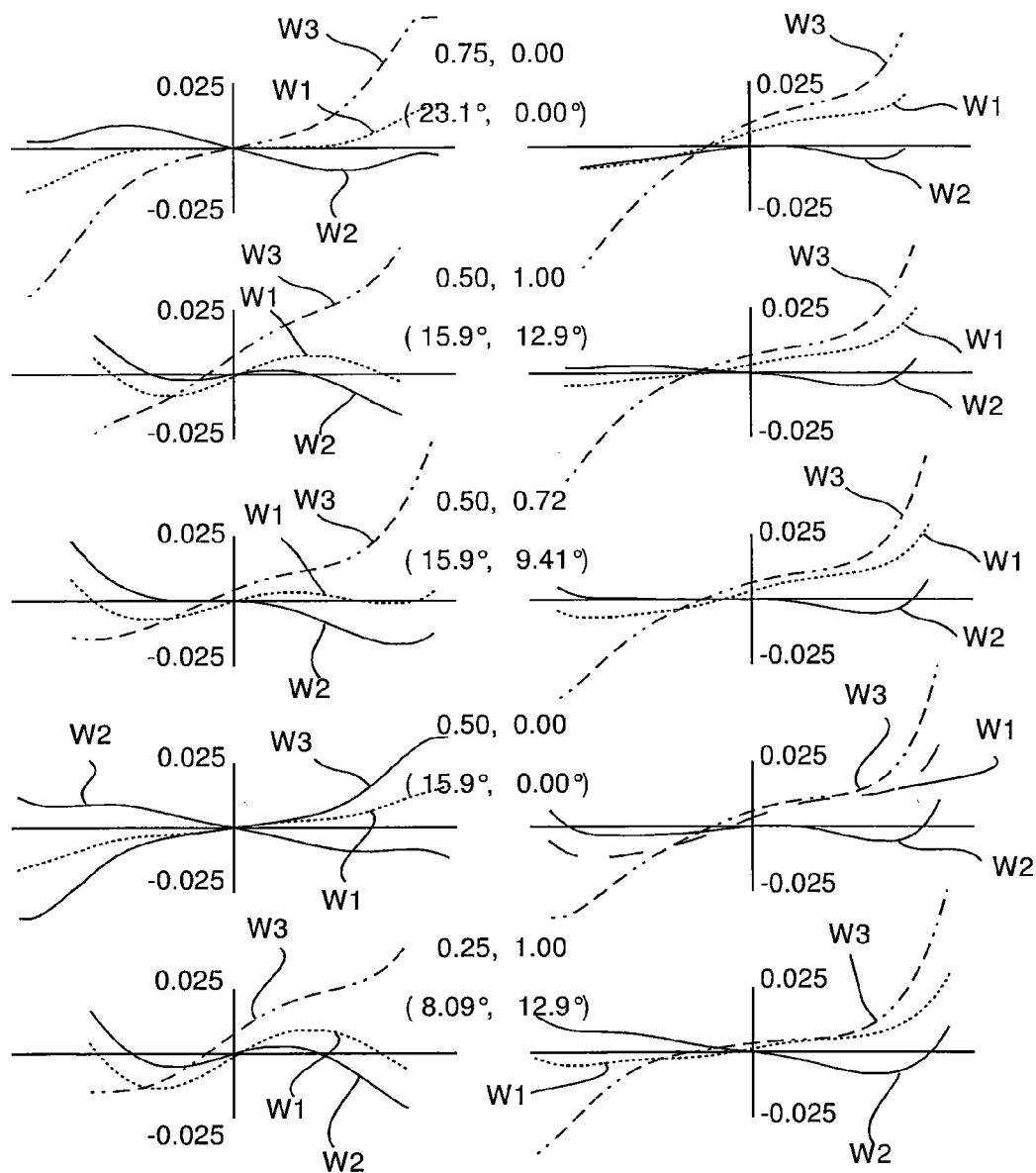
FIG. 18 depicts image error curves for the imaging objective according to FIGS. 12 and 13.
Figure 19:
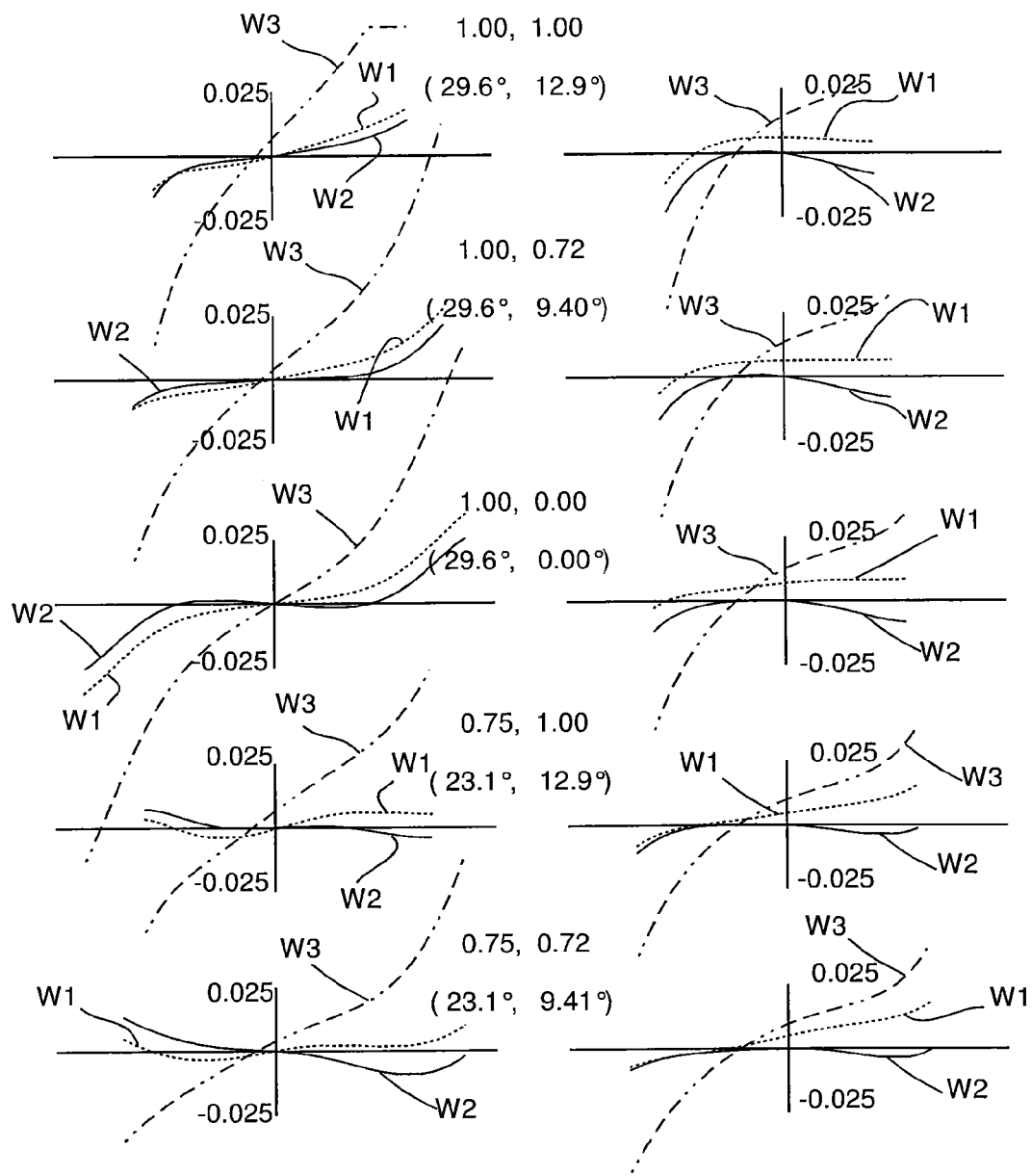
FIG. 19 depicts image error curves for the imaging objective according to FIGS. 12 and 13.

In FIGS. 14-16, the imaging errors are shown in the same way as FIGS. 4 through 6. Therefore, reference may be made to the corresponding above description. The image size of the imaging objective 1 according to FIGS. 12 and 13 is again 22.4 mm×18.8 mm and again only a rectangular quadrant of the image field is observed in the image error curves. The object distance is infinite in the illustrations of FIGS. 14 through 16.

The imaging objective 1 of FIGS. 12 and 13 has a horizontal focal width of 20 mm, a vertical focal width of 40 mm, a vertical opening number of 1.47, a horizontal opening number of 1.30, and an effective opening number of 1.38. The distance range is infinite to 372 mm, the overall length from the vertex of the first lens 22 up to the image plane being 198 mm.

A change of the distance range is possible by an essentially opposing displacement of the lenses 33 and 36. In the image error curves 17 to 19, the object distance is 600 mm.

Figure 20:
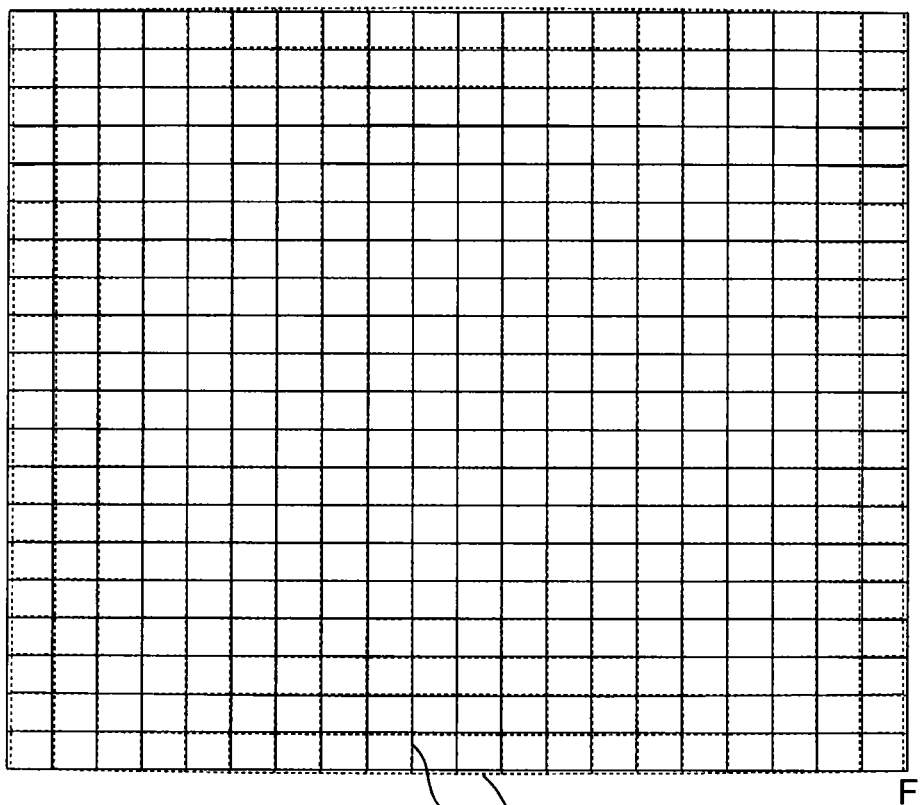
FIG. 20 is a schematic illustration to explain the distortion caused by the imaging objective of FIGS. 12 and 13.
Figure 21:
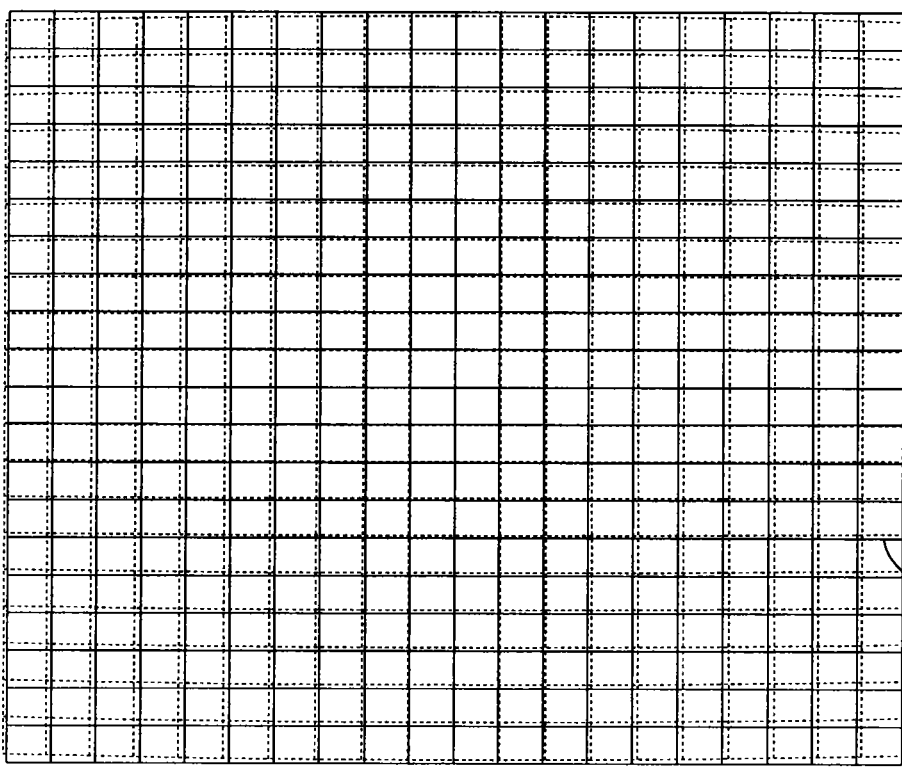
FIG. 21 is a schematic illustration to explain the distortion caused by the imaging objective of FIGS. 12 and 13.

FIGS. 20 and 21 are illustrations corresponding to FIGS. 10 and 11 and show the distortion for the imaging objective 1 of FIGS. 12 and 13 for an object distance of infinite (FIG. 20) and an object distance of 600 mm (FIG. 21). It results from these image error curves and distortion curves that the imaging objective 1 is outstandingly corrected.

Figure 22:
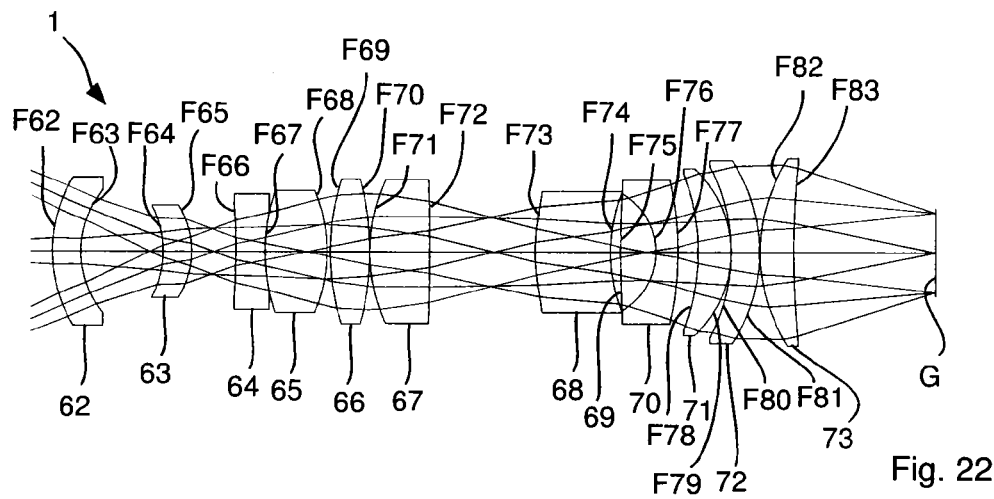
FIG. 22 depicts a vertical lens section of an anamorphic imaging objective according to a third embodiment.
Figure 23:
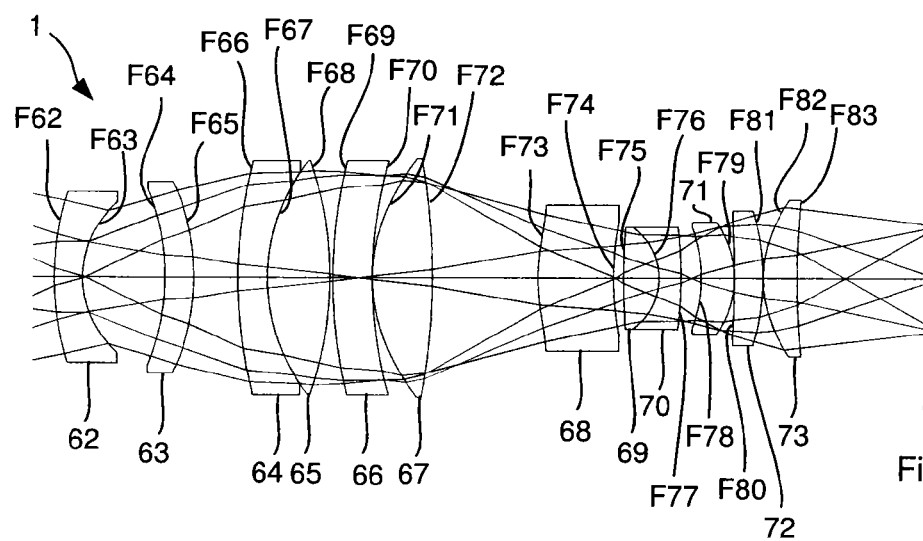
FIG. 23 depicts a horizontal lens section of the imaging objective of FIG. 22.
Figure 24:
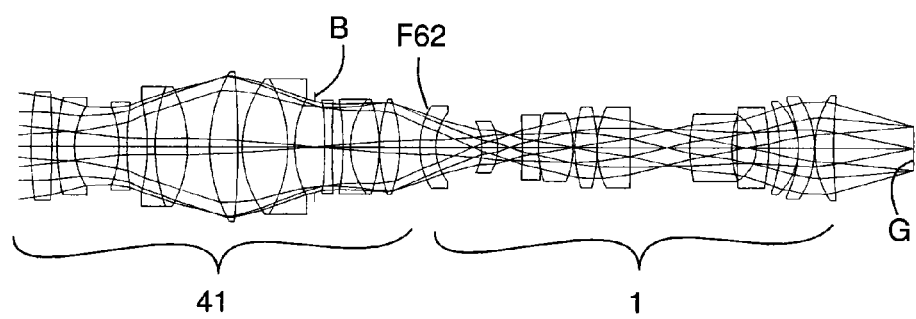
FIG. 24 depicts a vertical lens section of the imaging objective of FIGS. 22 and 23 together with a main objective 41.
Figure 25:
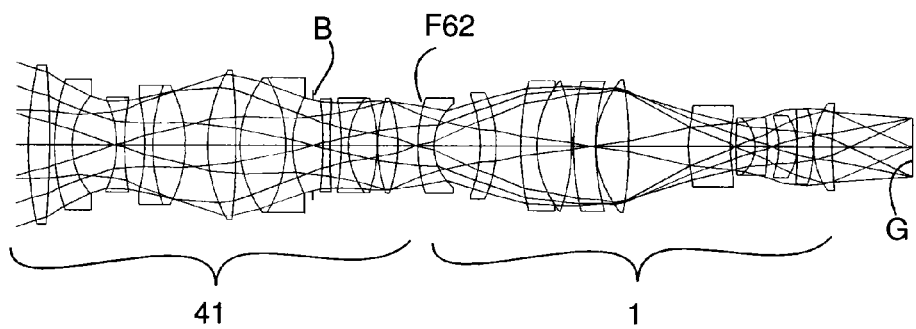
FIG. 25 depicts a horizontal lens section of the illustration of FIG. 24.

The anamorphic imaging objective 1 according to the invention may also be implemented as an intermediate imaging objective, which generates a desired anamorphic image together with a non-anamorphic main objective. For this purpose, the anamorphic imaging objective 1 is situated between the image-side last lens of the main objective 41 and the receiver or image plane G. The vertical and horizontal lens sections of the intermediate imaging objective 1 are shown in FIGS. 22 and 23. The vertical and horizontal lens sections are again shown in FIGS. 24 and 25, the main objective 41 also being shown in addition to the imaging objective 1.

The imaging objective 1 images the intermediate image (which may be the original image of the intermediate objective if the imaging objective has been designed for an already existing main objective 41) generated by the main objective 41 using different imaging scales in the vertical and horizontal main sectional planes, so that the desired anamorphic imaging is generated. This may be used, for example, during the recopying of a motion picture from a master filmstrip onto a copy filmstrip with simultaneous change of the anamorphic ratio. This is an example of imaging finite to finite.

The imaging objective 1 of FIGS. 22 and 23 has 12 lenses 62-73, two effective optical surfaces (F65 and F82) being implemented as free-form surfaces. The free-form surfaces F65, F82 may be described according to above formula 1, the parameter values being specified in following Table 7.

TABLE 7

|        | F65          | F82          |
|--------|--------------|--------------|
| R      | −28.02       | 35.24        |
| k      | 0.0000E+00   | 0.0000E+00   |
| C(2, 0)| 8.3909E−03   | 2.9999E−03   |
| C(0, 2)| −8.5923E−03  | −1.4638E−03  |
| C(4, 4)| 0.0000E+00   | 0.0000E+00   |
| C(2, 2)| 0.0000E+00   | 0.0000E+00   |
| C(0, 4)| 4.8760E−06   | 2.9922E−07   |
| C(6, 0)| 1.7837E−05   | −9.5696E−07  |
| C(4, 2)| −8.6199E−07  | −5.6140E−07  |
| C(2, 4)| 0.0000E+00   | 0.0000E+00   |
| C(0, 6)| 0.0000E+00   | 0.0000E+00   |
| C(2, 0)| 0.0000E+00   | 0.0000E+00   |
| C(0, 2)| 4.3993E−09   | 1.1035E−09   |
| C(4, 4)| 2.0554E−09   | 5.1752E−10   |
| C(2, 2)| −1.8451E−09  | 2.9810E−10   |
| C(0, 4)| 1.2712E−08   | 6.4566E−10   |

The surfaces F71 and F73 are implemented as rotation aspheres. They may be described according to above formula 2. The parameters are contained in following Table 8.

TABLE 8

|   | F71           | F73           |
|---|---------------|---------------|
| K | −0.405186E+00 | 0.0000E+00    |
| A | −0.578146E−06 | −0.147882E−04 |
| B | −0.568605E−09 | −0.528371E−08 |
| C | 0.461823E−12  | −0.773326E−10 |
| D | −0.327497E−15 | 0.181664E−12  |

The fundamental system construction may be inferred from following Table 9 in connection with FIGS. 22-25, the further surfaces either being spherically curved (if the radii Rx and Ry are equal) or being toric surfaces (if the radii Rx and Ry are different). The lenses 64 and 65 are cemented, so that the cemented surface F67 is specified in Table 9. This is also true for the cemented lenses 69 and 70, for which only the cemented surface F76 is specified.

TABLE 9

| Surface | Rx      | Ry      | Distance | Material |
|---------|---------|---------|----------|----------|
| B       |         |         | 60.0000  |          |
| F62     | 32.28   | 64.62   | 6.5000   | NSF4     |
| F63     | 22.52   | 22.55   | 18.7658  |          |
| F64     | −22.89  | −54.37  | 6.5670   | SLAL56   |
| F65     |         |         | 10.0000  |          |
| F66     | −142.46 | 110.50  | 6.5510   | SF4      |
| F67     | 43.33   | 43.33   | 14.0000  | NPSK53   |
| F68     | −34.61  | −82.05  | 0.7836   |          |
| F69     | 56.12   | 113.28  | 9.0000   | SFPL51   |
| F70     | −60.04  | 99.02   | 0.0100   |          |
| F71     | 38.09   | 38.09   | 13.5000  | NPSK53   |

TABLE 9-continued

| Surface | Rx      | Ry      | Distance | Material |
|---------|---------|---------|----------|----------|
| F72     | −469.92 | −155.54 | 24.0431  |          |
| F73     | 44.16   | 44.16   | 17.0933  | NFK51    |
| F74     | 38.17   | 69.98   | 2.2100   |          |
| F75     | 262.38  | 161.73  | 8.0000   | NFK51    |
| F76     | −15.47  | −14.50  | 5.0000   | LAFN7    |
| F77     | −75.82  | −95.40  | 4.4715   |          |
| F78     | −50.75  | −34.52  | 7.5000   | NPSK53   |
| F79     | −25.87  | −22.40  | 0.0100   |          |
| F80     | −42.02  | −253.90 | 6.5000   | NPSK53   |
| F81     | −37.88  | −54.15  | 0.1000   |          |
| F82     |         |         | 7.6000   | NLAF3    |
| F83     | 210.97  | 180.73  | 32.5000  |          |
| G       | ∞       | ∞       |          |          |

The imaging objective 1 according to the invention may be designed so that the operating distance of greater than 32 mm, which is necessary for a typical 35 mm film camera, is maintained in the image space.

In the simplest case, the intermediate imaging objective 1 may also be implemented so that all lenses of the imaging objective 1 are located behind the intermediate image plane, in which the main objective 41 images the image. In this case, it would be possible, for example, to also use the imaging objective 1 with those main objectives which have almost no free back focus in front of the image receiver.

However, to minimize the total overall length of the combined system made of main objective 41 and imaging objective 1, in an example embodiment, the imaging objective 1 may be implemented in such a way that one or more lenses of the imaging objective 1 are located between the image-side last lens of the main objective 41 and the intermediate image plane. In this case, the intermediate image does not have to be corrected per se in particular and may degenerate solely into an intermediate caustic. Intermediate caustic means that the beams which originate from a field point intersect in different axial positions in the two main sections, so that no perceptible intermediate image still exists in the typical meaning.

The part of the imaging objective 1 which is located between the image-side last lens of the main objective 41 and the intermediate image plane may be used for compensation of image errors which are generated by the remaining part of the imaging objective 1. In this way, a short total overall length and an outstanding image quality in the film plane may be achieved simultaneously.

Furthermore, the intermediate caustic is even advantageous in relation to an intermediate image. Thus, soiling on optical surfaces in proximity to the intermediate image cannot cause excessively strong local shadowing in the image. In particular, the main objective and/or the imaging objective 1, if it has effective optical surfaces between the image-side last lens of the main objective 41 and the intermediate image plane, may be implemented so that the desired intermediate caustic is provided. Thus, for example, the beam unifications in the area of the intermediate caustic may differ from one another by more than 1 cm in the horizontal and vertical sections. In this way, a sharp intermediate image does not arise in any sectional plane and the sensitivity of the optics to surface errors and soiling is effectively reduced.

The imaging objective 1 has an elliptical aperture stop having radius Rx=30 mm and Ry=40 mm. The object field is rectangular and has a side length of 24 mm in the x direction and 9 mm in the y direction. No artificial vignetting is provided on lens boundaries.

The described imaging objective 1 may be designed as follows, for example. Firstly, one proceeds from a model objective which is not yet corrected, which is provided as a computing model, having rotationally-symmetric effective optical surfaces. Several of the effective optical surfaces are then defined as anamorphically effective surfaces (having different optical power contributions in the two main sections). A numeric optimization for the desired anamorphic imaging is then performed, the minimization of one or more imaging errors being required as a criterion and/or boundary condition. A distribution of the refractive power in the two optical main sections is thus exclusively performed according to the criterion that an optimum partitioning of the refractive power for the correction of the imaging error(s) in the particular main section is obtained.

Thus, one does not proceed, as typical until now, from a main objective which is already corrected per se, which does not perform anamorphic imaging, but rather rotationally-symmetric imaging, in which a lens is then altered as an anamorphic lens or an anamorphic lens is added. This typical procedure results in the disadvantage that through the change of a lens in an already corrected objective or through the adding of the anamorphic lens, a plurality of undesired image errors is introduced.

In the procedure proposed here according to the invention, in contrast, an anamorphic approach is followed from the beginning, whereby better anamorphic objectives may be designed.

The necessary production data are derived from an anamorphic objective thus designed and the objective is then produced on the basis of these production data.

TABLE 10

| Material | Index of refraction at 587.56 nm | Abbe number at 587.56 nm |
|---|---|---|
| F2 | 1.61295 | 37.0 |
| F5 | 1.62435 | 35.9 |
| FK5 | 1.48749 | 79.4 |
| FK51 | 1.48656 | 84.5 |
| LAFN7 | 1.74950 | 35.0 |
| LLF6 | 1.53172 | 48.8 |
| NFK51 | 1.48656 | 84.5 |
| NLAF2 | 1.74397 | 44.9 |
| NLAF3 | 1.71700 | 48.0 |
| NLAF34 | 1.77250 | 49.6 |
| NLASF44 | 1.80420 | 46.5 |
| NPSK53 | 1.62014 | 63.5 |
| NSF4 | 1.75513 | 27.4 |
| SF2 | 1.64769 | 33.8 |
| SF4 | 1.75520 | 27.6 |
| SF5 | 1.67270 | 32.2 |
| SF6 | 1.80518 | 25.4 |
| SFPL51 | 1.49700 | 81.5 |
| SLAL56 | 1.67790 | 50.7 |

The invention claimed is:

1. An anamorphic imaging objective having multiple effective optical surfaces, comprising:
   at least one effective surface implemented as anamorphic; and
   in addition to the at least one effective surface implemented as anamorphic, at least one additional effective surface implemented as a free-form surface wherein at least one of the effective surfaces implemented as anamorphic is a non-free-form surface; and
   wherein at least one effective optical surface, which is implemented as a free-form surface, is positioned in a close-to-field manner in the objective and is used for independent influencing of the chief ray trajectory in both main sections.

2. The imaging objective according to claim 1, wherein at least a second effective surface implemented as anamorphic and the free-form surface are the same effective surface.

3. The imaging objective according to claim 1, wherein at least two effective surfaces are implemented as free-form surfaces.

4. The imaging objective according to claim 1, wherein three or four effective surfaces are implemented as free-form surfaces.

5. The imaging objective according to claim 1, wherein all of the effective optical surfaces are transparent.

6. An anamorphic imaging objective having multiple effective optical surfaces, comprising:
   at least one effective surface implemented as anamorphic; and
   in addition to the at least one effective surface implemented as anamorphic, at least one additional effective surface implemented as a free-form surface wherein at least one of the effective surfaces implemented as anamorphic is a non-free-form surface; and
   wherein the at least one effective optical surface, which is implemented as a free-form surface, is positioned near the aperture and corrects for coma and astigmatism of paraxial ray bundles.

7. The imaging objective according to claim 6, wherein at least one effective optical surface, which is implemented as a free-form surface, is positioned in a close-to-field manner in the objective.

8. The imaging objective according to claim 7, wherein the at least one free-form surface, which is positioned in the close-to-field manner, is used for independent influencing of the chief ray trajectory in both main sections.

9. An anamorphic imaging objective having multiple effective optical surfaces, comprising:
   at least one effective surface implemented as anamorphic; and
   in addition to the at least one effective surface implemented as anamorphic, at least one additional effective surface implemented as a free-form surface wherein at least one of the effective surfaces implemented as anamorphic is a non-free-form surface; and
   wherein the at least one free-form surface has an aspheric contour in both main sections.

10. An anamorphic imaging objective having multiple effective optical surfaces, comprising:
    at least one effective surface implemented as anamorphic; and
    in addition to the at least one effective surface implemented as anamorphic, at least one additional effective surface implemented as a free-form surface wherein at least one of the effective surfaces implemented as anamorphic is a non-free-form surface; and
    wherein at least one effective optical surface is implemented as a rotationally-symmetric asphere to correct rotationally-symmetric imaging errors including aperture dependent or field-dependent imaging errors.

11. An anamorphic imaging objective having multiple effective optical surfaces, comprising:
    at least one effective surface implemented as anamorphic; and
    in addition to the at least one effective surface implemented as anamorphic, at least one additional effective surface implemented as a free-form surface wherein at least one of the effective surfaces implemented as anamorphic is a non-free-form surface; and
    wherein one or more of the effective optical surfaces are axially displaceable jointly as a focusing group, to focus the imaging objective, each of the focal lengths of the focusing group in both main sections being inversely proportional to a focal length of the imaging objective in the corresponding main section.

12. A production method of an anamorphic imaging objective, comprising:
designing the anamorphic imaging objective;
deriving production data from the design;
producing the imaging objective on the basis of the production data, wherein the design of the imaging objective proceeds from a not yet corrected model objective having multiple effective optical surfaces, at least one of which is implemented as anamorphic and at least one additional surface of which is a free form surface and wherein at least one of the effective optical surfaces that is implemented as anamorphic is a non-free-form surface; and
performing a computer optimization such that a partition of the refractive power necessary for desired anamorphic imaging, which differs in the two optical main sections of the imaging objective, which are perpendicular to one another, is performed on the effective optical surfaces in each of the two optical main sections according to a criterion that imaging errors of the imaging objective are minimized.

13. The method according to claim 12, further comprising:
implementing multiple effective optical surfaces of the model objective anamorphically; and
ascertaining a difference of the two refractive power contributions in the main sections during the computer optimization according to the performed division of the refractive power for each anamorphic active surface, and if a value of the difference exceeds a minimum value, the effective surface is established as an anamorphic effective surface, and if the value falls below the minimum value, the effective surface is established as a rotationally-symmetric effective surface.

14. The method according to claim 12, further comprising providing at least one effective optical surface other than the non-free-form surface as a free-form surface, which has an aspheric contour in at least one of the two main sections and two planes of mirror symmetry lying in the main sections.

15. The method according to claim 13, further comprising providing at least one effective optical surface other than the non-free-form surface as a free-form surface, which has an aspheric contour in at least one of the two main sections and two planes of mirror symmetry lying in the main sections.

16. The method according to claim 14, wherein the free-form surface which has an aspheric contour in at least one of the two main sections and two planes of mirror symmetry lying in the main sections is provided as anamorphic.

17. The method according to claim 15, wherein the free-form surface which has an aspheric contour in at least one of the two main sections and two planes of mirror symmetry lying in the main sections is provided as anamorphic.

18. An anamorphic imaging objective having multiple effective optical surfaces, comprising:
at least one effective surface implemented as anamorphic; and
in addition to the at least one effective surface implemented as anamorphic, at least one additional effective surface implemented as a free-form surface wherein at least one of the effective surfaces implemented as anamorphic is a non-free-form surface; and
wherein the imaging objective has a vertical focal width and a horizontal focal width and a ratio of the vertical focal width to the horizontal focal width is about two to one.

19. An anamorphic imaging objective having multiple effective optical surfaces, comprising:
at least one effective surface implemented as anamorphic; and
in addition to the at least one effective surface implemented as anamorphic, at least one additional effective surface implemented as a free-form surface wherein at least one of the effective surfaces implemented as anamorphic is a non-free-form surface;
wherein the at least one effective optical surface, which is implemented as a free-form surface, is positioned near the aperture; and
wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.5.

20. The imaging objective according to claim 19, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.2.

21. The imaging objective according to claim 19, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.1.

22. The imaging objective according to claim 1, wherein at least one effective optical surface is implemented as a rotationally-symmetric asphere to correct rotationally-symmetric imaging errors.

23. The imaging objective according to claim 6, wherein at least a second surface implemented as anamorphic and the free-form surface are the same effective surface.

24. The imaging objective according to claim 6, wherein at least two effective surfaces are implemented as free-form surfaces.

25. The imaging objective according to claim 6, wherein three or four effective surfaces are implemented as free-form surfaces.

26. The imaging objective according to claim 6, wherein all of the effective optical surfaces are transparent.

27. The imaging objective according to claim 6, wherein the at least one free-form surface has an aspheric contour in both main sections.

28. The imaging objective according to claim 6, wherein at least one effective optical surface is implemented as a rotationally-symmetric asphere to correct rotationally-symmetric imaging errors.

29. The imaging objective according to claim 28, wherein the at least one effective optical surface, which is implemented as a rotationally-symmetric asphere, corrects for aperture dependent or field-dependent imaging errors.

30. The imaging objective according to claim 6, wherein one or more of the effective optical surfaces are axially displaceable jointly as a focusing group, to focus the imaging objective, each of the focal lengths of the focusing group in both main sections being inversely proportional to a focal length of the imaging objective in the corresponding main section.

31. The imaging objective according to claim 6, wherein the imaging objective has a vertical focal width and a horizontal focal width and a ratio of the vertical focal width to the horizontal focal width is about two to one.

32. The imaging objective according to claim 9, wherein at least a second effective surface implemented as anamorphic and the free-form surface are the same effective surface.

33. The imaging objective according to claim 9, wherein at least two effective surfaces are implemented as free-form surfaces.

34. The imaging objective according to claim 9, wherein three or four effective surfaces are implemented as free-form surfaces.

35. The imaging objective according to claim 9, wherein all of the effective optical surfaces are transparent.

36. The imaging objective according to claim 9, wherein at least one effective optical surface, which is implemented as a free-form surface, is positioned in a close-to-field manner in the objective.

37. The imaging objective according to claim 36, wherein the at least one free-form surface, which is positioned in the close-to-field manner, is used for independent influencing of the chief ray trajectory in both main sections.

38. The imaging objective according to claim 9, wherein the at least one effective optical surface, which is implemented as a free-form surface, is positioned near the aperture and corrects for coma and astigmatism of paraxial ray bundles.

39. The imaging objective according to claim 9, wherein at least one effective optical surface is implemented as a rotationally-symmetric asphere to correct rotationally-symmetric imaging errors.

40. The imaging objective according to claim 39, wherein the at least one effective optical surface, which is implemented as a rotationally-symmetric asphere, corrects for aperture dependent or field-dependent imaging errors.

41. The imaging objective according to claim 9, wherein one or more of the effective optical surfaces are axially displaceable jointly as a focusing group, to focus the imaging objective, each of the focal lengths of the focusing group in both main sections being inversely proportional to a focal length of the imaging objective in the corresponding main section.

42. The imaging objective according to claim 9, wherein the imaging objective has a vertical focal width and a horizontal focal width and a ratio of the vertical focal width to the horizontal focal width is about two to one.

43. The imaging objective according to claim 9, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.5.

44. The imaging objective according to claim 9, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.2.

45. The imaging objective according to claim 9, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.1.

46. The imaging objective according to claim 10, wherein at least a second effective surface implemented as anamorphic and the free-form surface are the same effective surface.

47. The imaging objective according to claim 10, wherein at least two effective surfaces are implemented as free-form surfaces.

48. The imaging objective according to claim 10, wherein three or four effective surfaces are implemented as free-form surfaces.

49. The imaging objective according to claim 10, wherein all of the effective optical surfaces are transparent.

50. The imaging objective according to claim 10, wherein at least one effective optical surface, which is implemented as a free-form surface, is positioned in a close-to-field manner in the objective.

51. The imaging objective according to claim 50, wherein the at least one free-form surface, which is positioned in the close-to-field manner, is used for independent influencing of the chief ray trajectory in both main sections.

52. The imaging objective according to claim 10, wherein the at least one effective optical surface, which is implemented as a free-form surface, is positioned near the aperture and corrects for coma and astigmatism of paraxial ray bundles.

53. The imaging objective according to claim 10, wherein one or more of the effective optical surfaces are axially displaceable jointly as a focusing group, to focus the imaging objective, each of the focal lengths of the focusing group in both main sections being inversely proportional to a focal length of the imaging objective in the corresponding main section.

54. The imaging objective according to claim 10, wherein the imaging objective has a vertical focal width and a horizontal focal width and a ratio of the vertical focal width to the horizontal focal width is about two to one.

55. The imaging objective according to claim 10, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.5.

56. The imaging objective according to claim 55, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.2.

57. The imaging objective according to claim 55, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.1.

58. The imaging objective according to claim 11, wherein at least a second effective surface implemented as anamorphic and the free-form surface are the same effective surface.

59. The imaging objective according to claim 11, wherein at least two effective surfaces are implemented as free-form surfaces.

60. The imaging objective according to claim 11, wherein three or four effective surfaces are implemented as free-form surfaces.

61. The imaging objective according to claim 11, wherein all of the effective optical surfaces are transparent.

62. The imaging objective according to claim 11, wherein at least one effective optical surface, which is implemented as a free-form surface, is positioned in a close-to-field manner in the objective.

63. The imaging objective according to claim 62, wherein the at least one free-form surface, which is positioned in the close-to-field manner, is used for independent influencing of the chief ray trajectory in both main sections.

64. The imaging objective according to claim 11, wherein the at least one effective optical surface, which is implemented as a rotationally-symmetric asphere, corrects for aperture dependent or field-dependent imaging errors.

65. The imaging objective according to claim 11, wherein the imaging objective has a vertical focal width and a horizontal focal width and a ratio of the vertical focal width to the horizontal focal width is about two to one.

66. The imaging objective according to claim 11, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.5.

67. The imaging objective according to claim 11, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.2.

68. The imaging objective according to claim 11, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.1.

69. The imaging objective according to claim 18, wherein at least a second effective surface implemented as anamorphic and the free-form surface are the same effective surface.

70. The imaging objective according to claim 18, wherein at least two effective surfaces are implemented as free-form surfaces.

71. The imaging objective according to claim 18, wherein three or four effective surfaces are implemented as free-form surfaces.

72. The imaging objective according to claim 18, wherein all of the effective optical surfaces are transparent.

73. The imaging objective according to claim 18, wherein at least one effective optical surface, which is implemented as a free-form surface, is positioned in a close-to-field manner in the objective.

74. The imaging objective according to claim 18, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.5.

75. The imaging objective according to claim 18, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.2.

76. The imaging objective according to claim 18, wherein the at least one effective optical surface is positioned near the aperture such that an absolute value of a ratio of the ray height of a marginal ray of a field point lying on the optical axis and a ray height of a chief ray of a field point at a maximum radial distance from the optical axis is less than 0.1.

77. The imaging objective according to claim 19, wherein at least a second effective surface implemented as anamorphic and the free-form surface are the same effective surface.

78. The imaging objective according to claim 19, wherein at least two effective surfaces are implemented as free-form surfaces.

79. The imaging objective according to claim 19, wherein three or four effective surfaces are implemented as free-form surfaces.

80. The imaging objective according to claim 19, wherein all of the effective optical surfaces are transparent.

81. The imaging objective according to claim 19, wherein at least one effective optical surface, which is implemented as a free-form surface, is positioned in a close-to-field manner in the objective.

82. The imaging objective according to claim 81, wherein the at least one free-form surface, which is positioned in the close-to-field manner, is used for independent influencing of the chief ray trajectory in both main sections.

83. The imaging objective according to claim 19, wherein at least one effective optical surface is implemented as a rotationally-symmetric asphere to correct rotationally-symmetric imaging errors.

* * * * *

UNITED STATES PATENT AND TRADEMARK OFFICE
CERTIFICATE OF CORRECTION

PATENT NO. : 8,174,773 B2 Page 1 of 1
APPLICATION NO. : 12/432216
DATED : May 8, 2012
INVENTOR(S) : Pretorius It is certified that error appears in the above-identified patent and that said Letters Patent is hereby corrected as shown below:

In the Specification

Col. 7, line 30, delete "$m+n \leqq 10$", insert -- $m+n \leq 10$ --.

Col. 7, line 32, delete "$m+n \leqq 6$", insert -- $m+n \leq 6$ --.

Signed and Sealed this
Twenty-second Day of April, 2014

Michelle K. Lee
*Deputy Director of the United States Patent and Trademark Office*